United States Patent
Brooks et al.

(10) Patent No.: US 12,110,046 B2
(45) Date of Patent: Oct. 8, 2024

(54) VEHICLE CONTROL SYSTEM AND METHOD

(71) Applicant: Transportation IP Holdings, LLC, Norwalk, CT (US)

(72) Inventors: James Brooks, Schenectady, NY (US); Kaitlyn A. Hrdlicka, Erie, PA (US); Joseph Wakeman, Melbourne, FL (US); Matthew Price, McKinney, TX (US)

(73) Assignee: Transportation IP Holdings, LLC, Norwalk, CT (US)

( * ) Notice: Subject to any disclaimer, the term of this patent is extended or adjusted under 35 U.S.C. 154(b) by 898 days.

(21) Appl. No.: 16/722,116

(22) Filed: Dec. 20, 2019

(65) Prior Publication Data

US 2021/0188332 A1 Jun. 24, 2021

(51) Int. Cl.
*B60W 50/14* (2020.01)
*B60W 40/08* (2012.01)
*B60W 50/08* (2020.01)
*B60W 50/10* (2012.01)
*B61L 3/00* (2006.01)
*B61L 15/00* (2006.01)
*B61L 27/04* (2006.01)
*G05D 1/00* (2024.01)

(52) U.S. Cl.
CPC ......... *B61L 15/0058* (2024.01); *B60W 40/08* (2013.01); *B61L 27/04* (2013.01); *G05D 1/0061* (2013.01); *G05D 1/021* (2013.01); *B60W 2040/0818* (2013.01); *B60W 2050/143* (2013.01); *B60W 2540/26* (2013.01)

(58) Field of Classification Search
None
See application file for complete search history.

(56) References Cited

U.S. PATENT DOCUMENTS

| | | | |
|---|---|---|---|
| 4,525,011 | A | 6/1985 | Wilson |
| 5,392,030 | A | 2/1995 | Adams |
| 6,371,575 | B1 | 4/2002 | Lewis et al. |
| 7,398,140 | B2 | 7/2008 | Kernwein et al. |
| 8,188,870 | B2 | 5/2012 | Kumar et al. |
| 10,370,012 | B2 | 8/2019 | Brooks et al. |

(Continued)

FOREIGN PATENT DOCUMENTS

| | | |
|---|---|---|
| DE | 102015003498 A1 * | 9/2016 |
| EP | 3543082 A1 * | 9/2019 |

*Primary Examiner* — Adam D Tissot
*Assistant Examiner* — Michael T Silva
(74) *Attorney, Agent, or Firm* — K&L Gates LLP

(57) ABSTRACT

System includes a controller comprising one or more processors configured to generate alertness requests to an operator of a vehicle system during a trip. The alertness requests are generated according to a determined routine. The controller is further configured to receive reactive inputs from the operator that are responsive to the alertness requests. The controller is further configured to determine whether the trip includes a permissible route segment for suspending the determined routine. The permissible route segment has a route characteristic of one or both of: a reduced likelihood of operator-required events occurring or a predicted workload for the operator that is less than a defined workload threshold.

21 Claims, 9 Drawing Sheets

(56) References Cited

U.S. PATENT DOCUMENTS

| | | | |
|---|---|---|---|
| 2015/0224998 A1* | 8/2015 | Prakah-Asante | B60W 40/09 701/36 |
| 2015/0274180 A1* | 10/2015 | Prakah-Asante | B60W 50/14 701/36 |
| 2015/0317847 A1* | 11/2015 | Prakah-Asante | G07C 5/0841 701/1 |
| 2016/0297449 A1 | 10/2016 | Heim et al. | |
| 2017/0096154 A1 | 4/2017 | Hurst | |
| 2018/0111552 A1* | 4/2018 | Neiswander | B60W 40/09 |
| 2018/0186234 A1* | 7/2018 | Mestha | G06K 9/00315 |
| 2018/0186379 A1* | 7/2018 | Brooks | B60W 50/082 |
| 2018/0257682 A1* | 9/2018 | Brooks | B61L 3/006 |
| 2019/0232966 A1* | 8/2019 | Prakah-Asante | B60W 50/14 |
| 2019/0359239 A1 | 11/2019 | Subrahmaniyan et al. | |
| 2019/0382039 A1 | 12/2019 | Brooks et al. | |
| 2020/0150759 A1* | 5/2020 | Zhang | G06F 3/017 |

* cited by examiner

VEHICLE CONTROL SYSTEM AND METHOD

BACKGROUND

Technical Field

The subject matter herein relates to systems that monitor alertness of vehicle operators.

Discussion of Art

Operators often work with alertness monitoring systems, which may also be referred to as vigilance control systems or fatigue management systems. Alertness monitoring systems interact with the operator so that the operator remains alert and in their proper position during operation. For example, an alertness monitoring system in a locomotive may periodically prompt the engineer to press a button or a touchscreen located in the cabin of the locomotive. If the engineer answers the prompt, the alertness monitoring system may reset and will prompt the engineer again at a later time. If the engineer fails to answer the prompt, the alertness monitoring system may generate an audible alarm. If the engineer fails to answer the prompt despite the audible alarm, the locomotive may initiate a penalty brake application and reduce locomotive power to idle to stop the locomotive. In addition to prompts, alertness monitoring systems can be reset if the engineer takes direct (e.g., manual) action. For instance, the alertness monitoring system may reset if the engineer physically changes a throttle setting or a brake setting.

Some vehicle systems are controlled by two or more operators who are positioned onboard the vehicle system. For example, some rail vehicle systems (e.g., trains) have the engineer and at least one conductor onboard. The conductor monitors operation of the rail vehicle system, restrictions on movement of the rail vehicle system (e.g., track warrants), and the like, to keep the engineer informed of the operation of the rail vehicle system. For example, the conductor may remind the engineer of upcoming events, double-check compliance of operating rules, checks on the states of wayside signals, handles paperwork and incoming mandatory directives from a dispatcher, and jogs the alertness of the engineer on monotonous stretches of a trip of the train.

Recently, industries have reduced the number of human operators and, in some cases, moved toward a single person operating the vehicle system. For example, railroad companies have suggested transitioning from a crew with multiple onboard members to a crew with fewer members or only one member (called single-crew) in which a single operator is onboard. Although this single operator may be aided by automatic control and/or a remote control, reducing the number of onboard crew members may still increase the workload (e.g., number of tasks) for the remaining crew members or member. Moreover, it becomes even more important that the crew member(s) remain alert during operation.

Whether for single-crew or multi-crew operation, operators who are alert may find the prompts from known alert systems unnecessarily intrusive and distracting, thereby making it more difficult to complete tasks while maintaining safety. It may be desirable to have a system and method that differs from those that are currently available.

BRIEF DESCRIPTION

In an embodiment, a system is provided that includes a controller comprising one or more processors configured to generate alertness requests to an operator of a vehicle system during a trip. The alertness requests are generated according to a determined routine. The controller is further configured to receive reactive inputs from the operator that are responsive to the alertness requests. The controller is further configured to determine whether the trip includes a permissible route segment for suspending the determined routine. The permissible route segment has a route characteristic of one or both of: a reduced likelihood of operator-required events occurring or a predicted workload for the operator that is less than a defined workload threshold.

In an embodiment, a method is provided that includes generating alertness requests to an operator of a vehicle system during a trip according to a determined routine. The method also includes receiving reactive inputs from the operator that are responsive to the alertness requests. The method also includes determining whether the trip includes a permissible route segment for suspending the determined routine. The permissible route segment has a route characteristic of at least one of: a reduced likelihood of operator-required events occurring, a predicted workload for the operator that is less than a defined workload baseline, or a predicted workload for the operator that is greater than a defined workload threshold.

In an embodiment, a vehicle control system is provided that includes an alertness monitoring system configured to generate alertness requests to an operator of a vehicle system and receive reactive inputs from the operator that are responsive to the alertness requests. The alertness monitoring system is further configured to detect an attentive quality of the operator that indicates alertness of the operator while operating the vehicle system. The vehicle control system also includes a controller configured to communicate the alertness requests to the alertness monitoring system according to a determined routine. Responsive to receiving the reactive inputs or detecting the attentive quality, the determined routine delays generating a subsequent alertness request. The controller is further configured to receive a suspension request and, responsive to receiving the suspension request, the controller is further configured to determine whether the trip includes a permissible route segment for suspending the determined routine.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
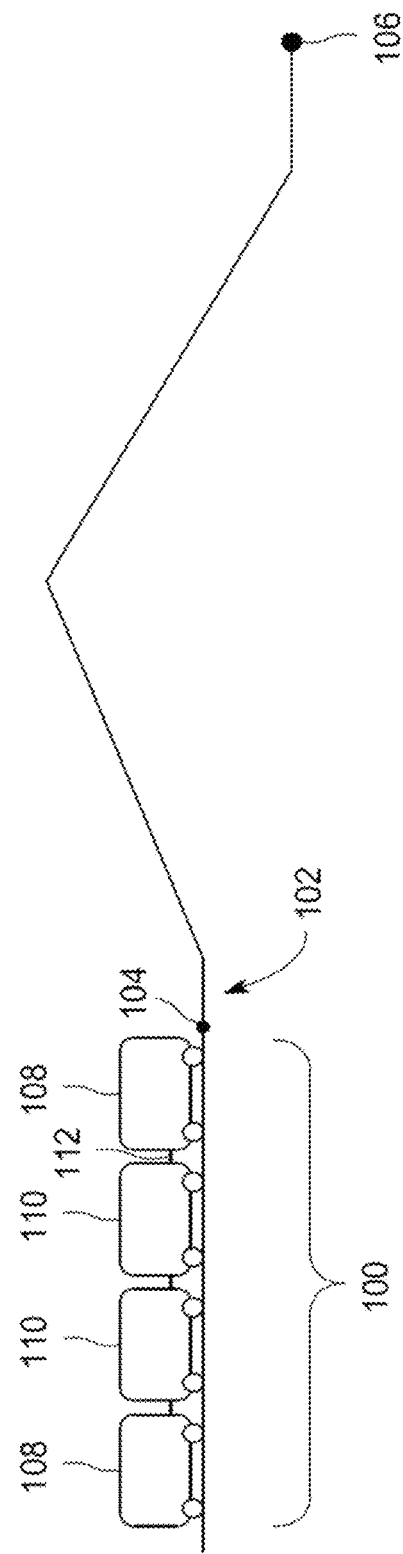
FIG. 1 is a schematic illustration of a vehicle system along a route in accordance with an embodiment.

Embodiments set forth herein include systems (e.g., vehicle control systems) and methods for monitoring or maintaining operator alertness during operation of a vehicle system. In particular embodiments, the vehicle system is a train having one or more locomotives and optional rail cars. Other embodiments may be suitable for other types of vehicle systems and machinery that utilize alertness monitoring systems, including automobiles, trucks, marine vessels, off-highway vehicle systems, manufacturing machinery, and agricultural vehicle systems and machinery. Embodiments may be particularly suitable for alertness monitoring systems in which the operator must perform a variety of tasks and it is desirable to suspend a determined routine (or schedule or algorithm) of prompts to the operator. Embodiments may also include systems and methods for identifying upcoming route segments that would be suitable for an operator to leave his or her station (e.g., take a break) and/or for adjusting the determined routine for monitoring alertness or vigilance.

In addition to systems and methods, embodiments may be characterized as an article of manufacture, such as a computer-readable medium (e.g., a tangible and non-transitory computer readable storage medium) having a program (e.g., one or more sets of instructions for directing a processor to perform one or more operations) recorded thereon. The program may enable, for example, the systems and methods described herein.

Embodiments may be particularly suitable for two-member crew operations or single-member crew operations. For example, freight trains may include a locomotive engineer and a conductor. The locomotive engineer can be responsible for operating the train. The conductor can assist in operating the train but may also have other duties, including supervising train operations and train safety and efficiency. The conductor may handle all pre- and post-trip activities, including ensuring accurate train makeup, handling all radio communications, and filling out all required forms. The conductor may also be responsible for providing reminders to the locomotive engineer of speed restrictions and limits of authority and ensuring compliance. This information is typically located on paperwork given to the crew prior to the start of a trip. The conductor also communicates with the dispatcher while en-route to receive trip information and is in charge of writing down the information and relaying it to the locomotive engineer. The conductor's responsibilities can extend beyond the cab (e.g., verifying placement of cars on the train and ensuring accurate hazmat placement, switching and setting out cars, cutting crossings, inspecting equipment, and when necessary, troubleshooting and repairing cars).

In single-member crews, many or all of the above responsibilities may be handled by a single person. Optionally, the single person may be assisted by a remotely-located system and/or remotely-located person.

As used herein, the terms "module," "system," "device," or "unit," may include a hardware and/or software system and circuitry that operate to perform one or more functions. For example, a module, unit, device, or system may include a computer processor, controller, or other logic-based device that performs operations based on instructions stored on a tangible and non-transitory computer readable storage medium, such as a computer memory. Alternatively, a module, unit, device, or system may include a hard-wired device that performs operations based on hard-wired logic and circuitry of the device. The modules, units, or systems shown in the attached figures may represent the hardware and circuitry that operates based on software or hardwired instructions, the software that directs hardware to perform the operations, or a combination thereof. The modules, systems, devices, or units can include or represent hardware circuits or circuitry that include and/or are connected with one or more processors, such as one or computer microprocessors.

Embodiments may include an embedded system that may be used to control a rail vehicle system, such as a locomotive or a consist that includes the locomotive. These embedded systems may operate in time-constrained environments, such as those experienced during a trip, that require the embedded systems to make complex calculations that a human would be unable to perform in a commercially reasonable time. Embedded systems may also be reactive such that the embedded systems change the performance of one or more mechanical devices (e.g., traction motors, braking subsystems) in response to detecting an operating condition. Embedded systems may be discrete units. For example, at least some embedded systems may be purchased and/or installed into the larger system as separate or discrete units.

Non-limiting examples of embedded systems that may be used by a vehicle system or machinery, such as those described herein, include a communication management unit (CMU), a consolidated control architecture (CCA), a locomotive command and control module (LCCM), a high-performance extended applications platform (HPEAP), and an energy management system (EMS). Other suitable systems may include a Modular Control Architecture (MCA) system. Such embedded systems may be part of a larger system, which may be referred to as a control system. The larger system may be the vehicle system (e.g., locomotive, truck, vessel). In certain embodiments, the CMU may communicate with an off-board system, such as a dispatch, and generate a trip plan based on input information received from the off-board system. In certain embodiments, the CCA may implement or execute the trip plan by controlling one or more traction motors and braking subsystems. The CCA may receive the trip plan from the CMU and communicate with the CMU as the vehicle system moves along the route. For example, the CMU may communicate a current time to the CCA. Optionally, the trip plan may include or be used to determine a determined routine for maintaining the alertness of the operator. Additionally, the trip plan may operate aspects of the vehicle causing it to travel over a segment of the route.

Throughout this document the term vehicle system is used. A vehicle system may include only one vehicle system or more than one vehicle system. If the vehicle system includes more than one vehicle system, the vehicle systems may be operably coupled to each other such that the vehicle systems move together as a system along a route. Optionally, the vehicle systems may coordinate their tractive efforts and braking efforts to move the vehicle system. For example, two or more vehicle systems may be mechanically coupled to travel together along the route. A vehicle system may also be referred to as a vehicle system consist in some embodiments.

Vehicle systems may include a single vehicle or a group of vehicles in which some or all of the vehicles can contribute at least one of propulsive efforts or braking efforts. For example, at least some embodiments may have a distributed power (DP) configuration or arrangement of propulsion-generating vehicles (e.g., locomotives or vehicle convoys). One of the conditions for automatically enabling the parked function may be whether a designated vehicle is a master vehicle system (called lead vehicle) of the vehicle system or a slave vehicle system (called remote vehicle) of the vehicle system. Lead vehicles transmit commands to one or more remote vehicles so that the lead and remote vehicles may coordinate efforts in moving the vehicle system.

A vehicle system may have one or more propulsion-generating vehicles (e.g., vehicles capable of generating propulsive forces or tractive efforts) connected together so as to provide motoring and/or braking capability for the vehicle system. The propulsion-generating vehicles (or propulsion vehicles) may be directly connected together in series with no other vehicle systems or cars between the propulsion-generating vehicles. Alternatively, one or more non-propulsion-generating vehicles (e.g., vehicle systems that are not capable of generating propulsive forces or tractive efforts) may be linked between two propulsion-generating vehicles. Non-propulsion-generating vehicles may include, for example, rail cars, passenger cars, or other vehicle systems that cannot generate propulsive force to propel the vehicle system.

Multiple interconnected propulsion-generating vehicles may form a vehicle system consist (or platoon or swarm) in which the propulsion-generating vehicles coordinate tractive and/or braking efforts with one another to move the vehicle system consist. One example is a locomotive consist that includes locomotives as the propulsion-generating vehicles. A larger vehicle system, such as a train, can have multiple sub-consists. Specifically, there can be a lead consist (of propulsion-generating vehicles), and one or more remote consists (of propulsion-generating vehicles), such as midway in a line of cars and another remote consist at the end of the train.

Although the illustrated examples include locomotives and locomotive consists, other vehicle systems may form the vehicle system. For example, a cargo carrier may include one or more propulsion-generating vehicles and one or more cargo cars for carrying cargo. Other types of vehicle systems may include automobiles, trucks, marine vessels, off-highway vehicle systems, and agricultural vehicle systems. In some embodiments, vehicle systems may not be mechanically coupled but may be logically coupled by the vehicle systems communicating with each other to coordinate their movements to travel as a vehicle system, consist or swarm (collectively "consist").

The vehicle system may have a lead propulsion-generating vehicle and a remote propulsion-generating vehicle. The terms "lead," "trail," and "remote" are used to indicate which of the propulsion-generating vehicles control operations of other propulsion-generating vehicles, and which propulsion-generating vehicles are controlled by other propulsion-generating vehicles, regardless of locations within the vehicle system. For example, a lead propulsion-generating vehicle can control the operations of the trail or remote propulsion-generating vehicles, even though the lead propulsion-generating vehicle may or may not be disposed at a front or leading end of the vehicle system along a direction of travel. In DP operation, throttle and braking commands are relayed from the lead propulsion-generating vehicle system to the remote propulsion-generating vehicle systems by wireless and/or wired connections.

A vehicle system can be configured for DP operation in which throttle and braking commands are relayed from the lead propulsion-generating vehicle to the remote propulsion-generating vehicles by wireless and/or hardwired links. DP operation may include synchronous or asynchronous control (e.g., of the traction motors, dynamic braking, and air brakes) of multiple remote locomotives within a single consist or vehicle system. In addition to commands transmitted from lead to remote vehicles, messages including status information may be transmitted from the remote vehicles to the lead vehicle.

Embodiments may be particularly suitable for positive train control (PTC) systems and networks. PTC systems are designed to prevent train-to-train collisions, derailments caused by excessive speeds, unauthorized movements in work zones, and the movement of rail vehicles through switches left in the wrong position. PTC systems enable real-time information sharing among trains, rail wayside devices, track transponders, and "back office" applications. PTC systems utilize a dispatch center that operates as a database and server for information related to the rail network and trains operating across the rail network. For example, the dispatch center may have one or more back office servers that are configured to receive and transmit speed limits, track composition, speed of individual locomotives, and train makeup. The dispatch center may authorize individual trains for moving into new segments of track. The dispatch center may interface with other railroad back office systems or applications. As such, one or more embodiments may communicate through a PTC network while determining whether a permissible route segment exists for suspending the determined routine.

At least one technical effect of one or more embodiments described herein includes a less distracting alertness monitoring system that generates fewer prompts for particular portions of the trip. Alternatively or in addition to the above, at least one technical effect may include an alertness monitoring system that allows an operator to leave a designated position (e.g., seat in cabin) to perform another task FIG. 1 illustrates one embodiment, generally referred to as a vehicle system 100, that travels along a route 102 from a first location 104 to a different, second location 106 according to a trip plan. The trip plan may be determined by an energy management system as described herein. The trip plan designates one or more operational settings, such as throttle settings, brake settings, speeds, etc., at different locations along one or more routes, different times during the trip, and/or different distances along the one or more routes. The operational settings of the trip plan are determined by the energy management system in order to reduce fuel consumed and/or emissions generated by the vehicle system relative to the vehicle system traveling along the same routes according to other settings, such as an upper speed limit of the routes, while causing the vehicle system to arrive within a designated amount (e.g., 10%) of a scheduled arrival time.

As shown in FIG. 1, the vehicle system includes one or more propulsion-generating vehicles 108 and optionally may include one or more non-propulsion-generating vehicles 110 (FIG. 1). The vehicles may be mechanically coupled with each other, such as by couplers 112, such that the vehicles travel together. Optionally, the vehicle system may include propulsion-generating vehicles that are logically connected to each other without being mechanically coupled with each other. For example, the propulsion-generating vehicles may communicate with each other to coordinate the movements of the vehicles with each other such that the vehicles travel together in a platoon.

The propulsion-generating vehicles can represent one or more different vehicles that generate tractive effort or power to move the vehicle system along the route. For example, the vehicles can represent automobiles, locomotives, other off-highway vehicles (e.g., vehicles that are not designed and/or not permitted to travel on public roadways), marine vessels, aircraft, or the like. The non-propulsion-generating vehicles can represent vehicles that do not generate tractive effort or power, or propulsive effort or power. For example, the vehicles can represent railcars, trailers, barges, or the like. Alternatively, the vehicle system may include a single propulsion-generating vehicle.

Figure 2:
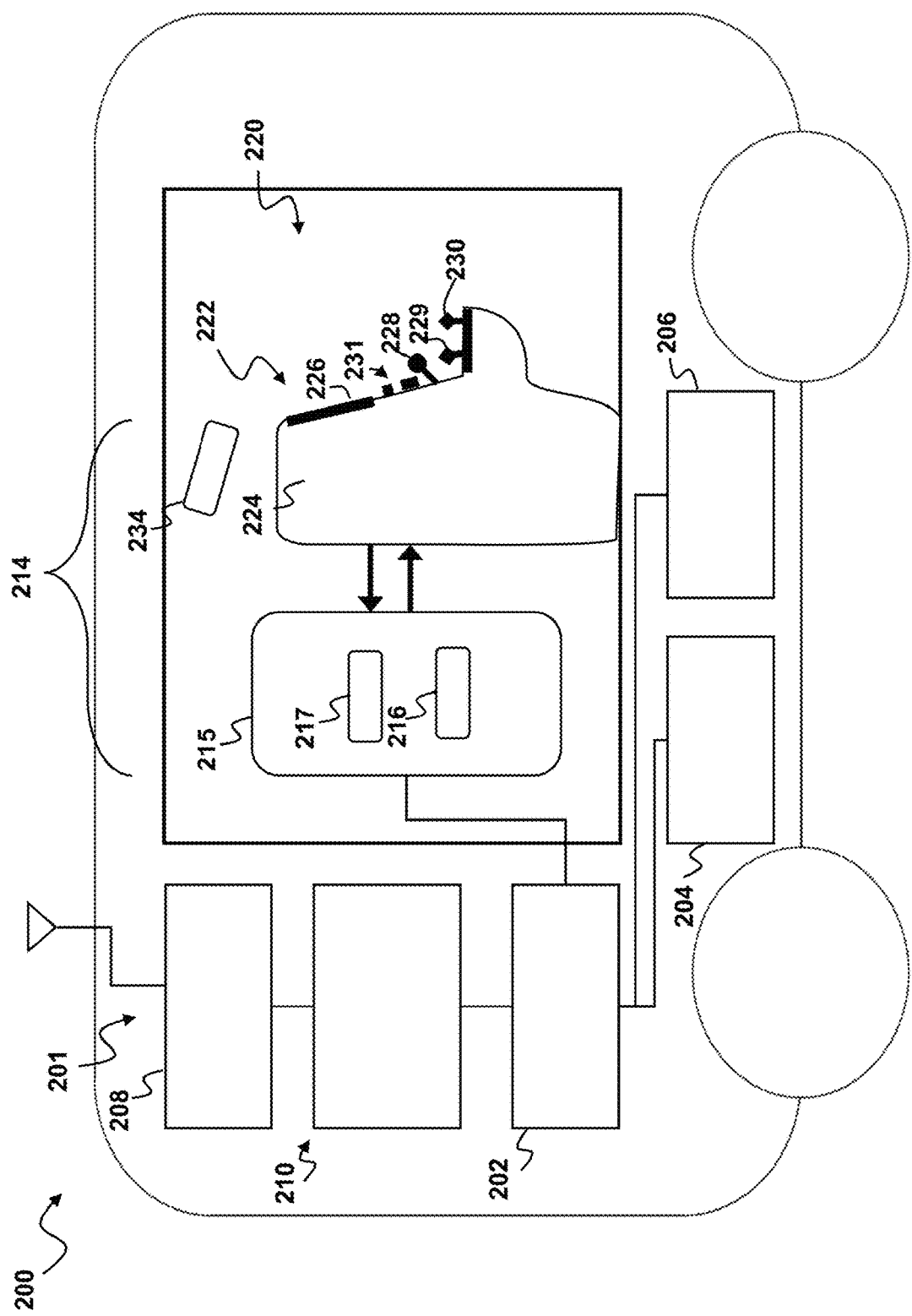
FIG. 2 is a schematic illustration of a vehicle in accordance with an embodiment that may be used with the vehicle system of FIG. 1.

FIG. 2 is a schematic illustration of a vehicle 200 according to one embodiment. The vehicle may represent one or more of the vehicles shown in FIG. 1. As shown, the vehicle includes a vehicle control system 201. The vehicle control system may include an adaptive capability that switches between automatic control and manual control in response to changes in the operating parameters as indicated by an energy management system 210 or changes in the operator's alertness as indicated by an alertness monitoring system 214.

The alertness monitoring system monitors how alert one or more operators of the vehicle system are, and provides alertness requests (e.g., prompts) to the operators. The operators provide reactive inputs (e.g., determined responses) to allow the vehicle system to continue moving. The alertness monitoring system can comprise an arrangement of components and/or methods that provide an indication of an operator's alertness. The alertness monitoring system may comply with local, state, regional, or country-wide regulations, such as those described in 37 Code of Federal Regulations (CFR) 229.140 of the United States. The system may determine a binary state, such as an alert state or a not-alert state. Alternatively, the system may determine a graduated or relative state of alertness, such as the degree to which the operator is alert or not-alert. This determination may be based on one or more factors, such as physiological parameters (e.g., heart rate), response time for entering reactive inputs, response time to reacting to instructions, errors in entering requested responses, and visually-identifiable characteristics (e.g., shoulder posture, back posture, sitting position, standing position, existence of head-nodding, degree of eyelid openness, or yawning or number of yawns in a given time period, etc.).

One exemplary embodiment of an alertness monitoring system includes a physical and psychophysiological (3P) model for estimating operator parameters and conditions including fatigue and drowsiness in real-time. The alertness monitoring system can generate alertness requests which may require an answer (e.g., input) from the operator at designated times. The alertness monitoring system may also measure reaction times to indicate an operator's awareness. Optionally, the alertness monitoring system includes an imaging device (e.g., camera) in which the image data is analyzed to identify characteristics that indicate a level of alertness. In some cases, the imaging device may be used to monitor the operator remotely by a supervisor.

The vehicle control system may represent or include one or more processors or other logic-based devices and one or more input devices (e.g., throttle, pedal, touchscreen, electronic mouse, stylus, microphone, or the like) that communicates commands from an operator to control operations of the vehicle. A motion controller 202 includes or represents hardware circuits or circuitry that include and/or are connected with one or more computer processors, such as one or more computer microprocessors. The motion controller can control operations of the vehicle and/or vehicle system, such as by autonomously controlling a propulsion system 204 and/or a braking system 206 of the vehicle according to an automatic control trip plan or revised automatic control trip plan, and/or by receiving input from an operator to manually control the propulsion system and/or the braking system according to the manual control trip plan.

The propulsion system represents one or more components that work to generate tractive effort or power. For example, the propulsion system can represent one or more motors, engines, or the like, that propel the vehicle. The braking system represents one or more components that work to slow or stop movement of the vehicle, such as airbrakes, friction brakes, or the like.

A communication unit 208 represents hardware circuits or circuitry that include and/or are connected with one or more computer processors (e.g., microprocessors) and communication devices (e.g., wireless antenna and/or wired connections) that operate as transmitters and/or transceivers for communicating signals with one or more locations disposed off-board the vehicle. For example, the communication unit may wirelessly communicate signals with a facility and/or another vehicle system, or the like. The communication unit may receive trip plans or revised trip plans from off-board locations and/or may communicate trip plans or revised trip plans to off-board locations.

The energy management system includes or represents hardware circuits or circuitry that include and/or are connected with one or more computer processors, such as one or more computer microprocessors. The energy management system creates and/or revises the operational settings designated by trip plans to form and/or revise the trip plans. One example of an energy management system includes the Trip Optimizer™ system of Wabtec Corporation, but alternatively may be another type of energy management system.

The energy management system can create and/or revise the automatic control trip plan based on trip planning data, such as trip data, vehicle data, and/or route data. The following describes the trip data, vehicle data, and route data, but it should be understood that some types of data may overlap. The data may be used to provide or determine parameters or route characteristics that are used by the controller for decision-making. Trip data includes information about an upcoming trip by the vehicle or vehicle system. Trip data may include departure times and arrival times for the overall trip, times for reaching designated locations (e.g., meet-up events), and/or arrival times, break times (e.g., the time that the vehicle system is stopped), and departure times at various designated stopping locations during the trip. The meet-up events include locations of passing loops and timing information for passing, or getting passed by, another vehicle system on the same route.

The designated locations may include the locations of wayside devices, passing loops, re-fueling stations, passenger, crew, and/or cargo changing stations, and the starting and destination locations for the trip. At least some of the designated locations may be designated stopping locations where the vehicle system is scheduled to come to a complete stop for a period of time. For example, a passenger changing station may be a designated stopping location, while a wayside device may be a designated location that is not a stopping location. The wayside device may be used to check on the on-time status of the vehicle system by comparing the actual time at which the vehicle system passes the designated wayside device along the route to a projected time for the vehicle system to pass the wayside device according to the trip plan.

Trip data may include station information (such as the location of a beginning station where the upcoming trip is to begin and/or the location of an ending station where the upcoming trip is to end), restriction information (such as work zone identifications, or information on locations where the track is being repaired or is near another track being repaired and corresponding speed/throttle limitations on the rail vehicle), and/or operating mode information (such as speed/throttle limitations on the vehicle system in various locations, slow orders, and the like).

Vehicle data includes information about the vehicle, vehicle system, and/or cargo being carried by the vehicle and/or vehicle system. For example, vehicle data may represent cargo content (such as information representative of cargo being transported by the vehicle) and/or vehicle information (such as model numbers, manufacturers, horsepower, and the like, of the vehicle).

Route data includes information about the route upon which the vehicle or vehicle system travels. Route data may include information on the route, such as information relating to the geography or topography of various segments along the route (e.g., effective track grade and curvature), speed limits for designated segments of a route, maximum cumulative and/or instantaneous emissions for a designated segment of the route, locations of intersections (e.g., railroad crossings), locations of certain track features (e.g., crests, sags, curves, and super-elevations), locations of mileposts, and locations of grade changes, sidings, depot yards, and fuel stations. The route data, where appropriate, may be a function of distance or correspond to a designated distance of the route. Route data may be used to provide or determine a parameter of a route segment.

The information related to the route to be traversed by the vehicle system may also include the existence and/or location of known slow orders or damaged segments of the route, and the like. Other information can include information that impacts the fuel efficiency of the vehicle system, such as atmospheric pressure, temperature, and the like. The route data may include a grade profile that indicates the grade of the route as a function of location or time, elevation slow warnings, environmental conditions (e.g., rain and snow), and curvature information. The route data may include information about locations of damaged sections of a route, locations of route sections that are under repair or construction, the curvature and/or grade of a route, and the like.

During operation, the operator may be within a designated space 220, such as a cabin or control room, where controls for operating the vehicle system are located. The vehicle system includes an operator interface 222. The operator interface may be, for example, an operator console or instrument panel that presents a plurality of operator-controlled devices that enable the operator to control the vehicle system. An operator-controlled device is configured to be enabled by the operator to instruct the vehicle system to perform a desired action. As shown, the operator interface may include a panel or dashboard 224 having a control screen 226 that presents information to the operator regarding operation of the vehicle system. The panel also includes a plurality of operator-controlled devices, which may include a reverser handle or lever 228, a throttle handle or slider 229, a brake handle or slider 230, one or more buttons/knobs/switches 231. The operator interface may also include a communication device (e.g., voice receiver) (not shown). Other operator-controlled devices may include, for example, a keyboard, mouse, or touchpad.

The control screen may also include virtual operator-controlled devices. A virtual operator-controlled device is a graphical-user-interface (GUI) element (e.g., graphical icon) displayed on the control screen. Similar to the physical operator-controlled devices described above, the virtual operator-controlled devices are configured to be enabled by the operator to instruct the vehicle system to perform a desired action.

The alertness monitoring system includes an operator-alertness controller 215 that includes one or more processors 216 that are configured to generate one or more alertness requests (e.g., prompts) to the operator and receive reactive inputs from the operator that are responsive to the alertness requests. The alertness requests may be generated according to a determined routine. The determined routine includes a schedule or algorithm for when the alertness requests are generated. An alertness request can be, for example, a GUI element displayed on the control screen, such as a window, that requests the operator to press the window or another area of the control screen or to engage one of the physical devices, such as one of the buttons, knobs, or switches. In some embodiments, the alertness request is presented only at the control screen where the operator should be present (e.g., operating control station) so that other individuals could not respond to the alertness request. The alertness request may only be a visible request, only an audible request, or both. As another example, the alertness request may be a visible request that, if not answered, also includes an added audible request.

The operator-alertness controller may detect an attentive quality of the operator that indicates alertness while operating the vehicle. The attentive quality can include a direct action taken by the operator for controlling the vehicle system, a physiological feature of the operator, or both. Responsive to detecting the attentive quality, the operator-alertness controller may delay generating a subsequent alertness request in the determined routine. Non-limiting examples of direct actions taken for controlling the vehicle system include at least one of a change in throttle position, a change in generator field switch position, a change in brake position, a horn activation, a change in a reverse handle position, a sand activation by the operator, a voice detection, an operator manipulation of a steering device, an operator manipulation of a dead-man device, an operator manipulation of a control device in the vehicle, or a touch detection on a display screen or touch pad. The change in throttle or brake positions (or settings) may be made by gripping a handle or slider or by pressing a GUI element on the control screen.

A physiological feature of the operator may be an observation of the physical body or appearance of the operator that indicates alertness. For example, the physiological feature of the operator may include biometric data (e.g., blood pressure, pulse, respiration rate, etc.), sagging posture, leaning of head, head nods, gaze direction, expressions, eye-ball motions, pose, gestures, blinking, yawning, and the like. These observations may be made, for example, by sensors (e.g., pulse oximeter, thermal camera) or an imaging system 234. In some embodiments, the operator characteristic includes how quickly the operator completes tasks or how quickly and/or correctly the operator responds to a test presented by the control screen. In particular embodiments, the alertness monitoring system includes a fully contactless imaging system and a physical and psychophysiological (3P) model for estimating operator parameters and conditions including fatigue and drowsiness in real-time.

The operator-alertness controller may also include a workload module 217 that includes task-specific data for the designated trip. For example, the workload module may include or use a database of tasks and estimated time for completing such tasks. The database may include different data sets for the same task, different data sets for the same trip, or different data sets for the same vehicle system. For example, the same task may have an estimated time of completion for a multi-member crew that differs from the estimated time of completion for a single-crew member. Types of tasks and estimated times for completing the tasks may be different for different vehicle systems, different routes, different trips, different times of day, different seasons, and/or different weather conditions. The operator-alertness controller may use the task-specific data to create a determined routine for generating alertness requests.

The operator-alertness controller may also use the task-specific data to determine whether one or more route segments (e.g., a current route segment or upcoming route segment(s)) are permissible route segments for suspending the determined routine. The determined routine may be suspended, for example, so that the operator may leave the designated position (e.g., to take a personal break) or so that the operator will be less distracted while controlling the vehicle system (e.g., while traveling through a congested area). Suspension may be requested by the operator and/or may be proposed to the operator by the operator-alertness controller. For example, the operator-alertness controller may inform the operator that the present time or an approaching time period would be a good time to take a break compared to other time periods.

Figure 3:
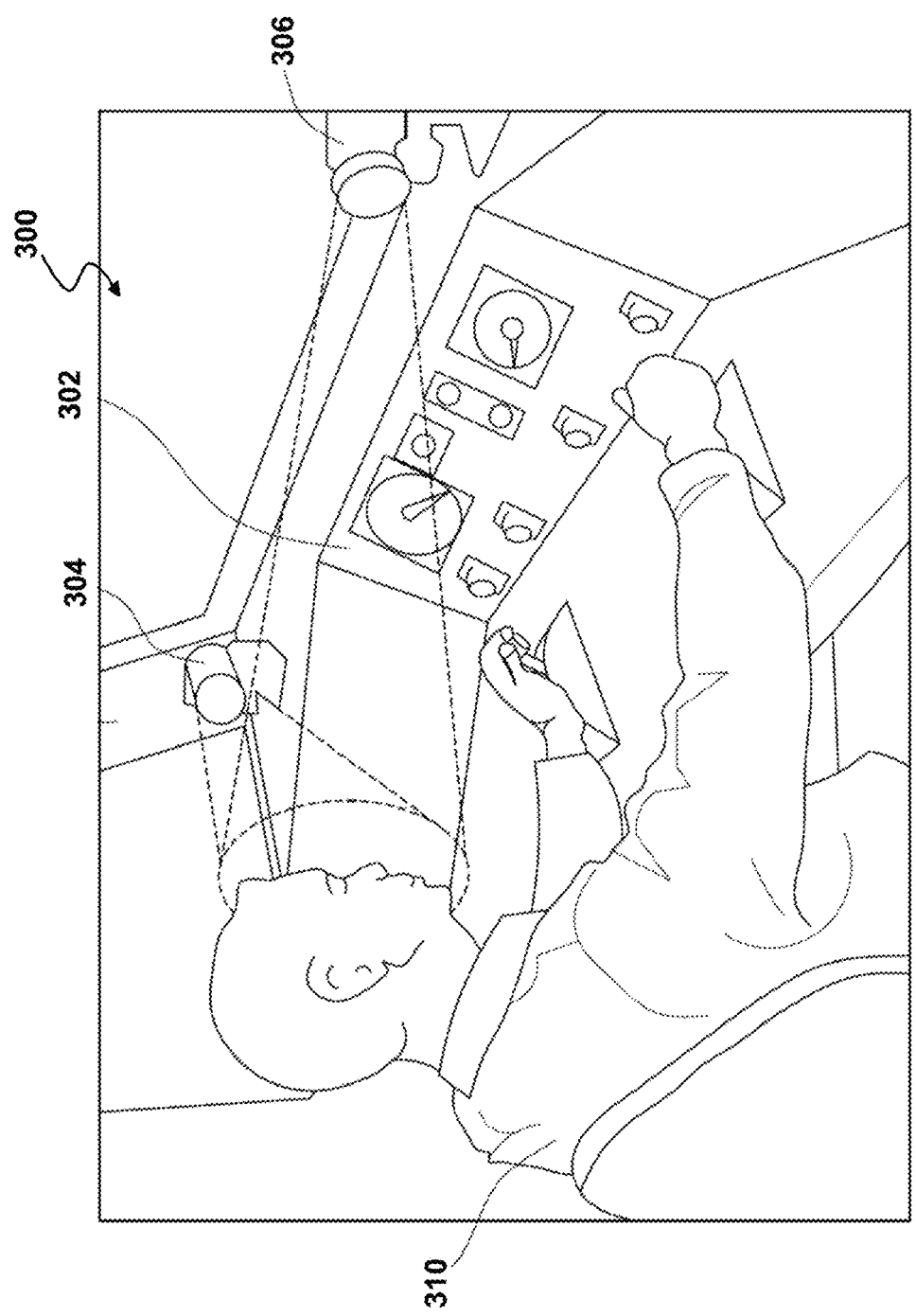
FIG. 3 illustrates an operator interface that includes an alertness monitoring system in accordance with an embodiment.

FIG. 3 illustrates an operator interface 300 having an imaging system 302 that includes a first imaging device 304 and a second imaging device 306. The first imaging device may include an RGB (Red Blue Green) digital camera, that can be a RGBD (Red, Green, Blue, Depth) camera, and the second imaging device may include a thermal camera that both provide data to the one or more processors for creating a physically and psychophysiologically output of an operator 310 in real-time. The one or more processors utilize the data from the RGB camera and thermal camera to passively measure bio-signals emanated, including an operator's face during night or day while the operator is on the job, without asking the operator to indicate alertness periodically. Thus, alertness monitoring system can be usable during the day or night without additional illuminators depending on imaging device types inside the operator's cabin or surrounding environment, or electrodes affixed to the skin. As a result, this allows for long monitoring functions unobtrusively inside the vehicle.

The first imaging device is an RGB camera. Other suitable imaging devices may include a reflected near infrared (NIR) camera or a shortwave infrared (SWIR) camera. The RGB, NIR and SWIR cameras may be instrumented with suitable illuminators. Similarly, the second imaging device, is a thermal camera in this embodiment. Other suitable imaging devices may include a midwave infrared (MWIR) or a longwave infrared (LWIR) camera which can collect emitted waves. Other imaging devices of interest suitable for this kind of alerter is ultra-wide band microwave imaging technology. Depth measuring imaging devices such as Kinect, Multi and hyperspectral cameras in the visible and infrared wavelength range are other imaging devices suitable for use in the alerter technology. Combinations of these imaging devices may be used to extract 3P information about the operator intervention.

Historical data related to physical, physiological, or psychophysiological (3P) parameters of the operator in the form of a 3P model is generated through experimentation to be used by the alertness monitoring system. A 3P model is a relationship between features (or indicators) from non-contact sensor data to cognitive indicators derived from body-worn sensor(s) data responsible for fatigue and alertness. During experiments, an imaging system provides data related to visible physical characteristics (i.e., physical indicators) of the operator. These include, but are not limited to, sagging posture, leaning of head, head nods, gaze direction, expressions, eye-ball motions, pose, gestures, blinking, yawning, and the like.

During experiments, psychophysiological indicators such as pulse rate, respiration rate, heart rate variability, peak-to-peak pulse locations, power in harmonics, knowledge-based/shallow/deep learning features are generated from blood flow data coming from below the skin and can be measured using imaging devices as well as with body-worn devices well-known to the medical community, including: electroencephalographic (EEG), photoplethysmographic (PPG), videoplethysmographic (VPG), electrocardiographic (ECG), ballistocardiographic (BCG), electromyographic (EMG), phonocardiographic (PCG), galvanic skin response (GSR), transcranial Doppler (TCD) sonography, and functional near infrared (fNIR) signals.

The alertness monitoring system can be unobtrusive and based on physiological cues rather than only behaviors as indicated by physical characteristics. The alertness monitoring system can use task-relevant knowledge of expected behaviors and workload. The alertness monitoring system measures psychological data that includes data related to fatigue and drowsiness and other operator based parameters with advanced capabilities. For example, with highly sensitive thermal imagery of the operator's face, one can extract additional information associated with psychophysiology (e.g., emotion, joy, arousal etc.) by monitoring thermal changes in regions such as nose, cheeks, periorbitallsupra-orbital regions, forehead, maxillary, neck-carotid, lips/mouth and the like.

Figure 4:
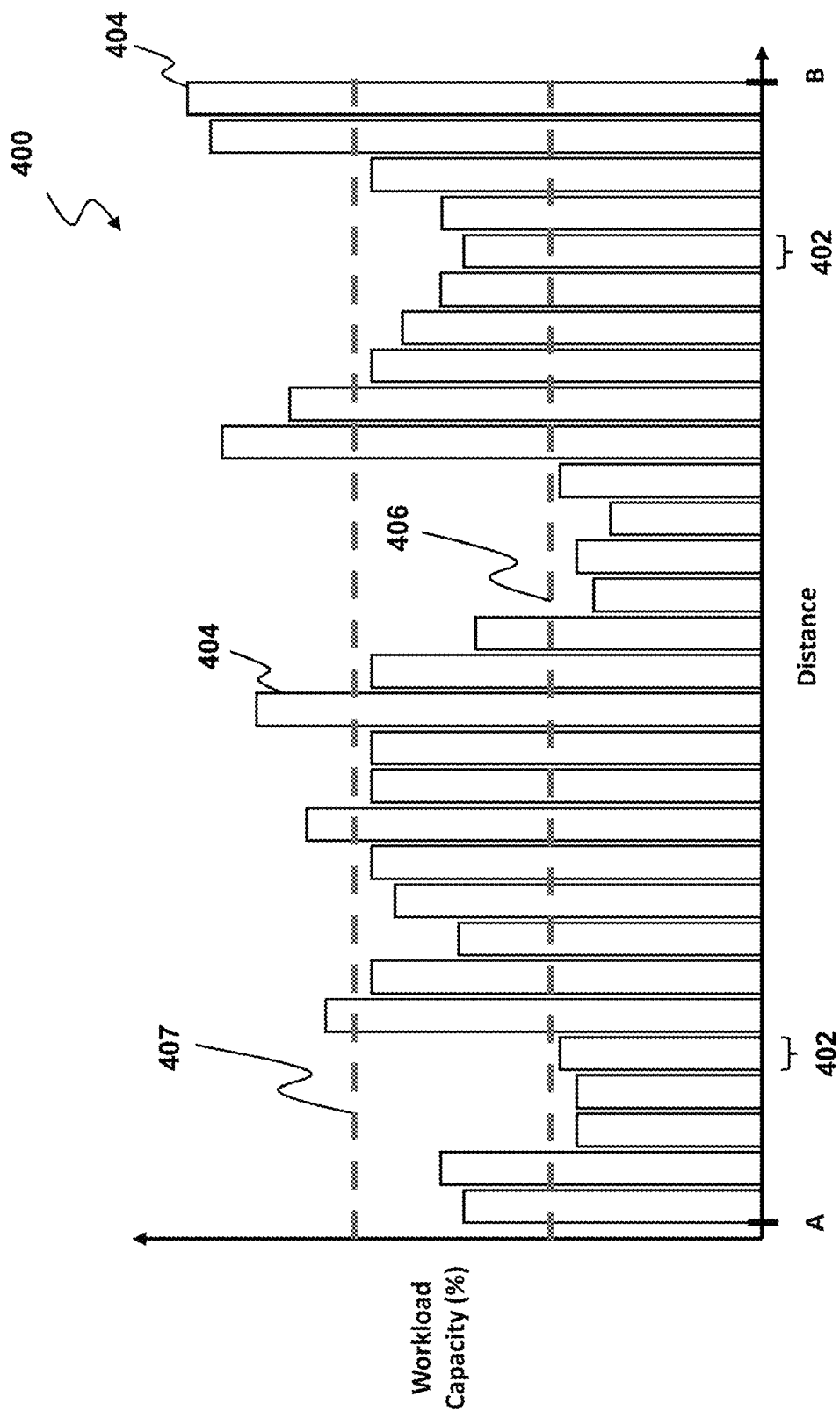
FIG. 4 is a chart illustrating an estimated workload for an operator at different portions of a designated trip.

FIG. 4 is a chart 400 illustrating an estimated workload for an operator at different portions of a designated trip that extends from point A to point B. The chart may also represent a workload-capacity model for a designated trip. The chart 400 may be based on the task-specific data that is used to determine if a route segment is a permissible route segment for suspending the determined routine. As shown, the trip is divided into designated segments 402 of the trip (or blocks of distance). Each column 404 represents the percentage of workload capacity during the respective segment of the trip. Each segment may represent, for example, one or two miles or five or ten kilometers. Alternatively, the chart could also represent the estimated workload for an operator at different time periods during the trip. For example, each of the columns may represent the percentage of workload capacity at a designated five-minute or ten-minute interval.

The workload capacity model may be a function of the expected tasks to be completed during the trip by the crew (multi-member or single member) and the expected time for each task. One or more tasks may require, for example, monitoring displays and readings of operating parameters (e.g., speed, brake pressure, fuel, etc.), monitoring warning systems and environmental conditions, communicating or monitoring communication with other vehicle systems or a command base, reviewing and recording designated information (e.g., measurement readings, time when certain events occurred), attending to unexpected situations (e.g., new work order, obstruction on the track), adjusting throttle or brake settings (e.g., for temporary speed restrictions), or monitoring and responding to route signals (e.g., railway track signals). Types of tasks and estimated times for completing the tasks may be different for different crews, different vehicle systems, different routes, different trips, different times of day, different seasons, and/or different weather conditions.

Task-specific data may be based on, for example, historical data using record books or by direct observation. Moreover, task-specific data may be collected through field observations and interviews and/or focus groups with conductors, engineers, trainers, and training managers. Using the above data, models may be constructed for determining how tasks affect workload and simulations performed to generate predictive algorithms that may be used, among other things, to determine the permissible route segment(s).

Dashed lines 406, 407 in FIG. 4 represent a defined workload baseline and a defined workload threshold, respectively. The workload baseline and workload threshold may be selected based on, for example, historical data and/or simulations. In some embodiments, a route segment that is permissible for suspending an alertness routine may correspond to a workload that is less than the workload baseline. In this case, suspending the routine allows the operator to take a personal break. Alternatively or in addition to the workload baseline, the permissible route segments may be those that have a reduced likelihood of operator-required events (e.g., events that require manual control). In some embodiments, a route segment that is permissible for suspending an alertness routine may correspond to a workload that is more than the workload threshold. In this case, suspending the routine allows the operator to work with fewer distractions.

Figure 5:
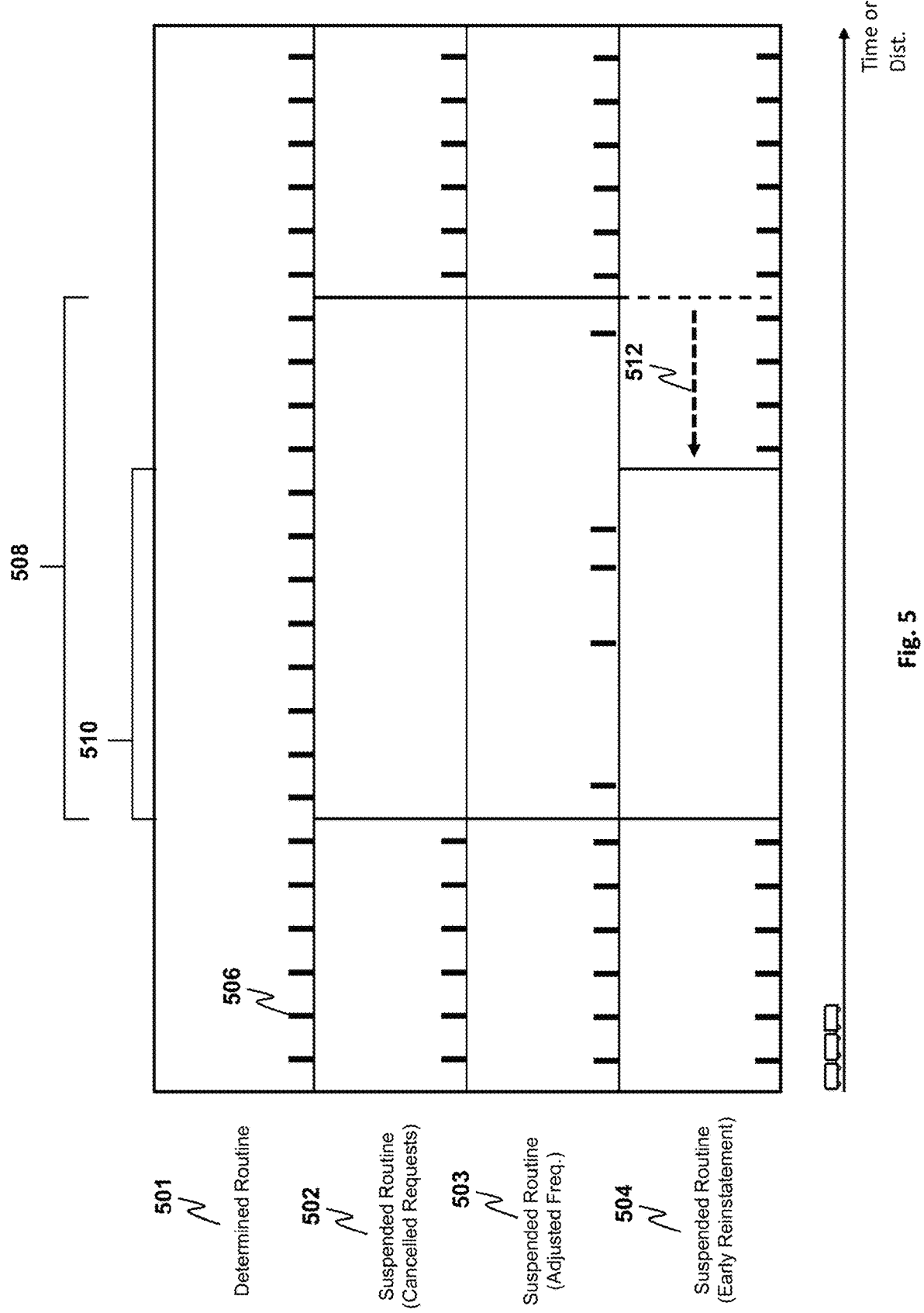
FIG. 5 illustrates how a determined routine may be suspended in accordance with one embodiment.

FIG. 5 illustrates how a determined routine 501 may be suspended. More specifically, FIG. 5 shows how the determined routine used to monitor alertness may be suspended in accordance with an embodiment. The determined routine is shown as periodic series of requests 506. In this case, the determined routine only accepts reactive inputs (e.g., pressing designated button). For each reactive input that is responsive to an alertness request, the determined routine does not sound an alarm or cause a penalty brake application but generates another alertness request according to the determine routine. In other embodiments, the determined routine will delay generating a subsequent alertness request in response to detecting an attentive quality.

One type of suspension is illustrated with the determined routine 502. In this case, the alertness requests for a designated route segment 508 are cancelled entirely. In other words, the controller will not generate alertness requests for the operator to respond. At an end of the route segment 508, the determined routine 502 is reinstated and the operator may be prompted again with alertness requests. As described herein, the determined routine can also detect attentive qualities to delay generating the alertness requests.

Another type of suspension is illustrated with the determined routine 503. In this case, the alertness requests for a designated route segment 508 have a modified frequency that is not periodic. The frequency of the alertness requests may be changed based on a modified determined routine. For example, instead of generating the alertness requests at a periodic frequency, the alertness requests may only be generated if other conditions are satisfied. For example, the alertness monitoring system may determine that the eyes of the operator have been focused in one direction for an excessive period of time. Responsive to this determination, the controller may issue an alertness request. In such instances, the operator can be distracted less frequently compared to the determined routine 501. Nonetheless, alertness requests are still permitted along the permissible route segment 508.

The determined routine 504 illustrates a routine, such as the determined routine having cancelled requests, in which the determined routine has been reinstated sooner than expected as indicated by the arrow 512. In FIG. 5, the route segment is a shortened route segment 510. Reinstatement may occur sooner than expected for a variety of reasons. For example, an earlier reinstatement of the routine may occur because a designated event has occurred, a designated input from the operator was received, a signal from an off-board system was received, determining that another vehicle is approaching, determining that proximate weather conditions have changed, or determining that traffic proximate to the permissible route segment has changed.

Figure 6:
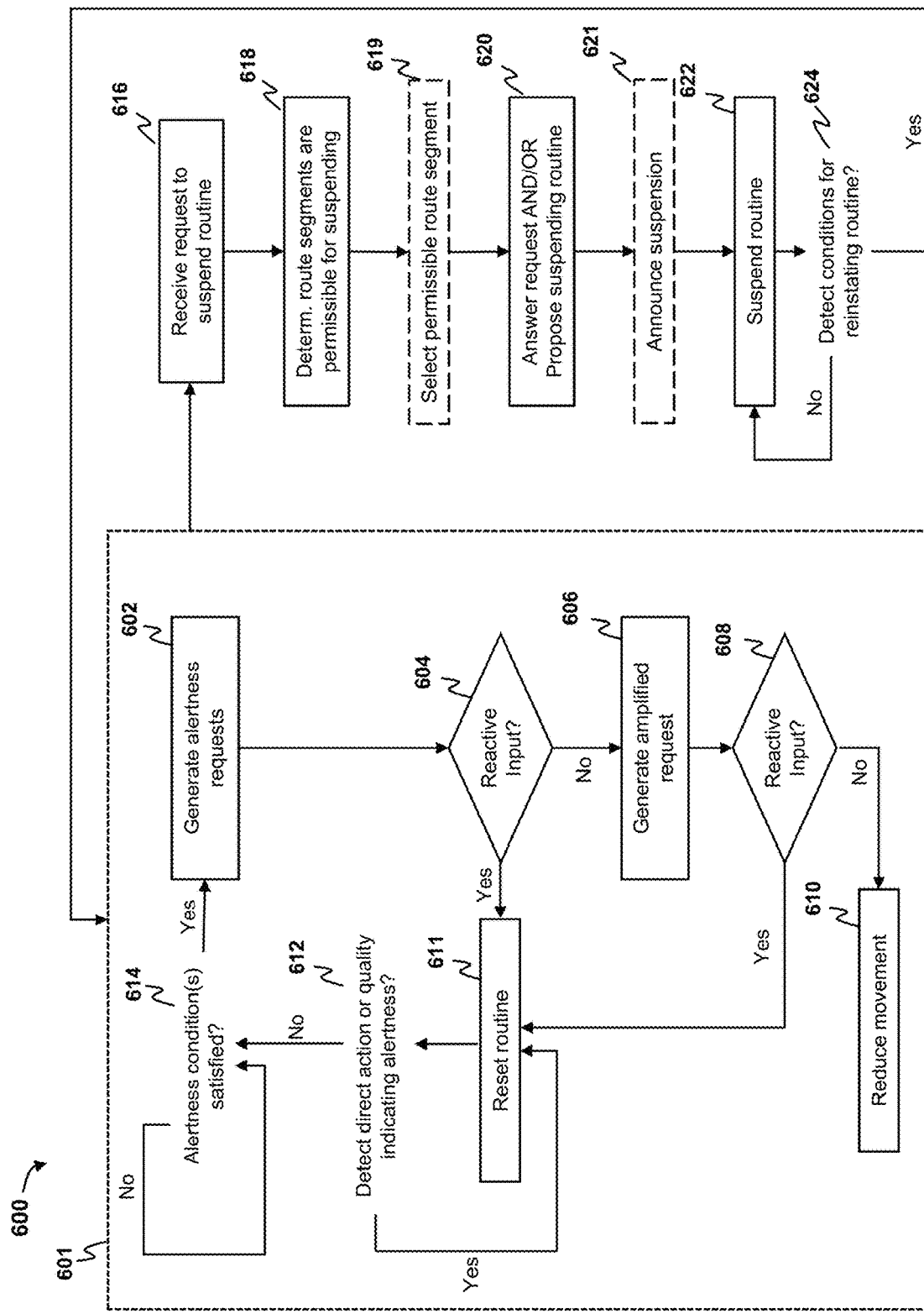
FIG. 6 is a flow chart illustrating a method in accordance with an embodiment.

FIG. 6 shows a flow chart illustrating a method 600 in accordance with one embodiment. The method may be, for example, a method of operating an alertness monitoring system or a method of operating a vehicle system with a human operator. The method may be carried out by the vehicle system described herein. The method may also be implemented by one or more processors that are configured to execute one or more sets of instructions stored in memory (e.g., one or more computer-readable mediums). The computer-readable medium (e.g., a tangible and non-transitory computer readable storage medium) may have one or more programs (or sets of instructions) that direct the controller to perform one or more operations, such as those described herein. For example, the methods may be implemented by one or more processors within, for example, a vehicle having an operator that is physically present and onboard with at least a portion of the alertness monitoring system. In such an embodiment, the steps or operations described herein may be performed by a program stored in memory and operable in a processor (e.g., microprocessor or other logic-based device). When implemented in a processor, program code may configure the processor to create logical and arithmetic operations to process the steps and/or operations.

The method includes a determined routine 601 for generating alertness requests. The alertness requests are perceptible to the human operator and effectively request the human operator to respond to the request with one or more operator inputs. Because these operator inputs are in response to the alertness request, they are referred to as reactive inputs. The alertness requests are typically generated within a designated space where the operator is located. In some embodiments, the operator may can only respond to the alertness request if the operator is present within the designated space (e.g., a location where the operator may control movement of the vehicle system). In other embodiments, however, it is contemplated that the operator may respond to the alertness request within another space. The alertness requests may be audible, visible, or tactile, or a combination thereof. For example, a GUI element on the control screen within the designated space may flash while an alarm sound is generated. Alertness requests can be tactile when, for example, an object (e.g., handle, steering wheel, touchpad, or handheld wireless controller) vibrates.

FIG. 6 illustrates one particular determined routine, but it should be understood that a variety of determined routines exists. For example, the determined routine may be a function of a single variable (e.g., time or certain re-occurring events) or a function of multiple variables (e.g., function of time and speed of the vehicle system). Optionally, the determined routine may have certain triggers that, if detected, immediately generate the alertness request. Accordingly, the determined routine can be relatively simple or more complex. In addition to varying complexity, the routine may be reset in different manners. For example, in FIG. 6, the determined routine may be reset in response to reactive inputs, in which the reactive input is a direct action that essentially responds to the alertness request, or by detecting operator actions or characteristics, in which the operator actions or characteristics are caused by other reasons. For example, the operator action of adjusting the throttle setting may reset the determined routine, although the operator action was not responsive to an alertness request. Nonetheless, the operator action is indicative of the operator being appropriately positioned and alert within the designated space. In other embodiments, however, the determined routine may only be reset based on reactive inputs from the operator (e.g., pressing a button or area of a control screen in response to the alertness requests). In one embodiment, based on various measured factors the alertness monitoring system may switch modes for the reset manner from a standard or simple first mode to a second mode that may be relatively more cognitively engaging for the operator.

The determined routine of FIG. 6 includes generating, at 602, the alertness request in accordance with the determined routine. At 604, it is determined whether a reactive input was received in response to the alertness request. More specifically, it is determined whether the operator performed one or more defined reactive inputs as described herein. If the reactive input is not received, an amplified request may be generated at 606. Optionally, an amplified request may be similar to the alertness request but modified to more easily draw attention to the request. For example, alarm sounds of the amplified request may be louder than the alarm sounds of the alertness request. If the reactive input is not received in response to the amplified request at 608, movement of the vehicle system may be reduced at 610. For example, a penalty brake application may be initiated that quickly slows the vehicle system. If the reactive input is received during the reduction of the movement, operation of the vehicle system may be fully restored. In other embodiments, however, operation of the vehicle system may be restored only after the vehicle system has completely or near completely stopped.

If the reactive input is made responsive to the alertness request or the amplified request, the determined routine may be reset at 611. Upon resetting of the determined routine, the determined routine may then query whether an operator action and/or characteristic has been detected, at 612, or whether one or more alertness conditions has been satisfied at 614. The alertness condition may be, for example, whether a designated amount of time has elapsed without detecting operator actions and/or characteristics. The designated amount of time, which may or may not be a function of speed. Upon determining that the designated alertness condition(s) was/were satisfied, the routine may again generate an alertness request.

As used herein, the terms "reset" or "resetting" and derivatives thereof does not necessarily mean that the routine, after resetting, returns to the same starting point and proceeds through the same process prior to resetting. Resetting the routine essentially means it has been determined that the operator satisfies the conditions for being alert, and that the routine will now either detect another indication that the operator is alert (e.g., detect operator action/characteristic or receive a reactive input) or determine that the operator is not alert. If the routine detects another indication that the operator is alert, the routine resets again and repeats.

However, each cycle of the routine is not required to be the same process. To illustrate one example, suppose the routine is reset in response to receiving a reactive input. The routine may then detect an operator characteristic that is indicative of the operator being alert. For example, it may be determined that the operator is alert due to the biometric data. After repeatedly resetting due to the same determination (e.g., alertness based on biometric data), the routine may generate an alertness request even if the biometric data still indicates that the operator is alert. This may be done to confirm that the biometric data is accurate. Nonetheless, the alertness requests may occur less frequently compared to conventional alerter systems. As such, the routine may not require that each cycle of the routine be the same.

Further, in one embodiment, the reset function may differ depending on determined factors. A first mode of operation may have the alertness request be simple, such as the activation of the manual reset, bell, and sand switches, movement of the air brake, horn, throttle, and dynamic brake handles, as well as pressing a softkey on the Engineer's operating display. In the second mode, the alertness request may require a more complex response from the operator. For example, the alertness request may ask the operator to engage an Alerter Reset softkey or button that is randomly located at one of the softkey positions (F1 thru F8). Alternatively, the Alerter Reset softkey may not consecutively appear in the same position requiring a scan of the screen to locate it. Other differences may include changing shape, color or size of the softkey. Sequences may be used where the alertness request includes directions to press another key, or a sequence of keys (e.g., F1 then F7 then F2) or to press multiple keys simultaneously (e.g., F1+F3). The system may determine that extra attention to the alertness process may distract from operation, as noted herein, and may decrease the cognitive complexity of the alertness request accordingly. Alternatively, the system may increase the complexity of the alertness request in advance of a known route segment that requires such increased level of alertness.

Figure 9:
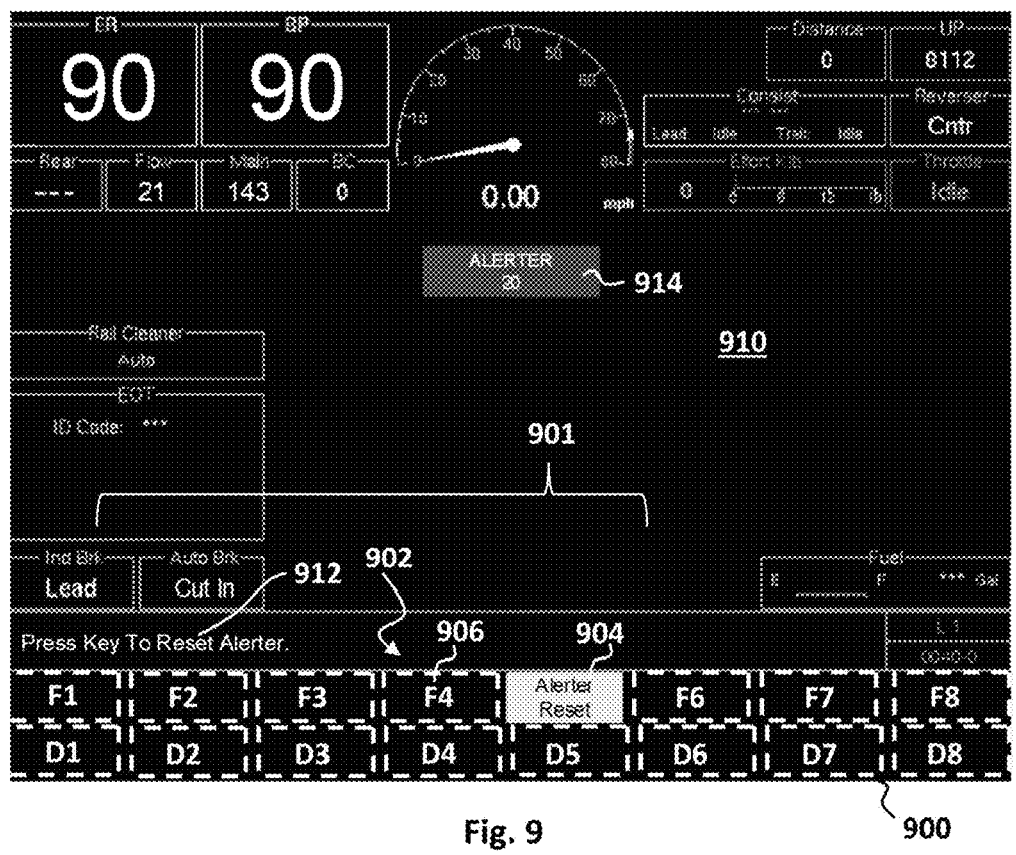
FIG. 9 illustrates a layout of a control screen in accordance with an embodiment having a directed alertness request (DAR) displayed.
Figure 10:
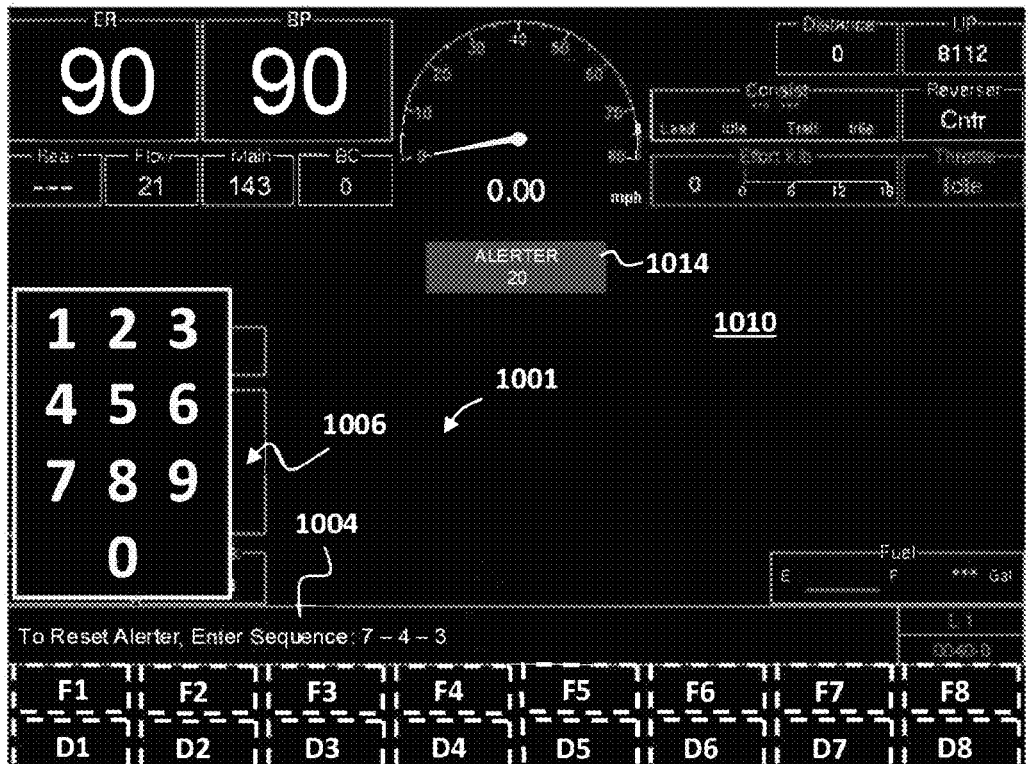
FIG. 10 illustrates a layout of a control screen in accordance with an embodiment having a DAR displayed.
Figure 11:
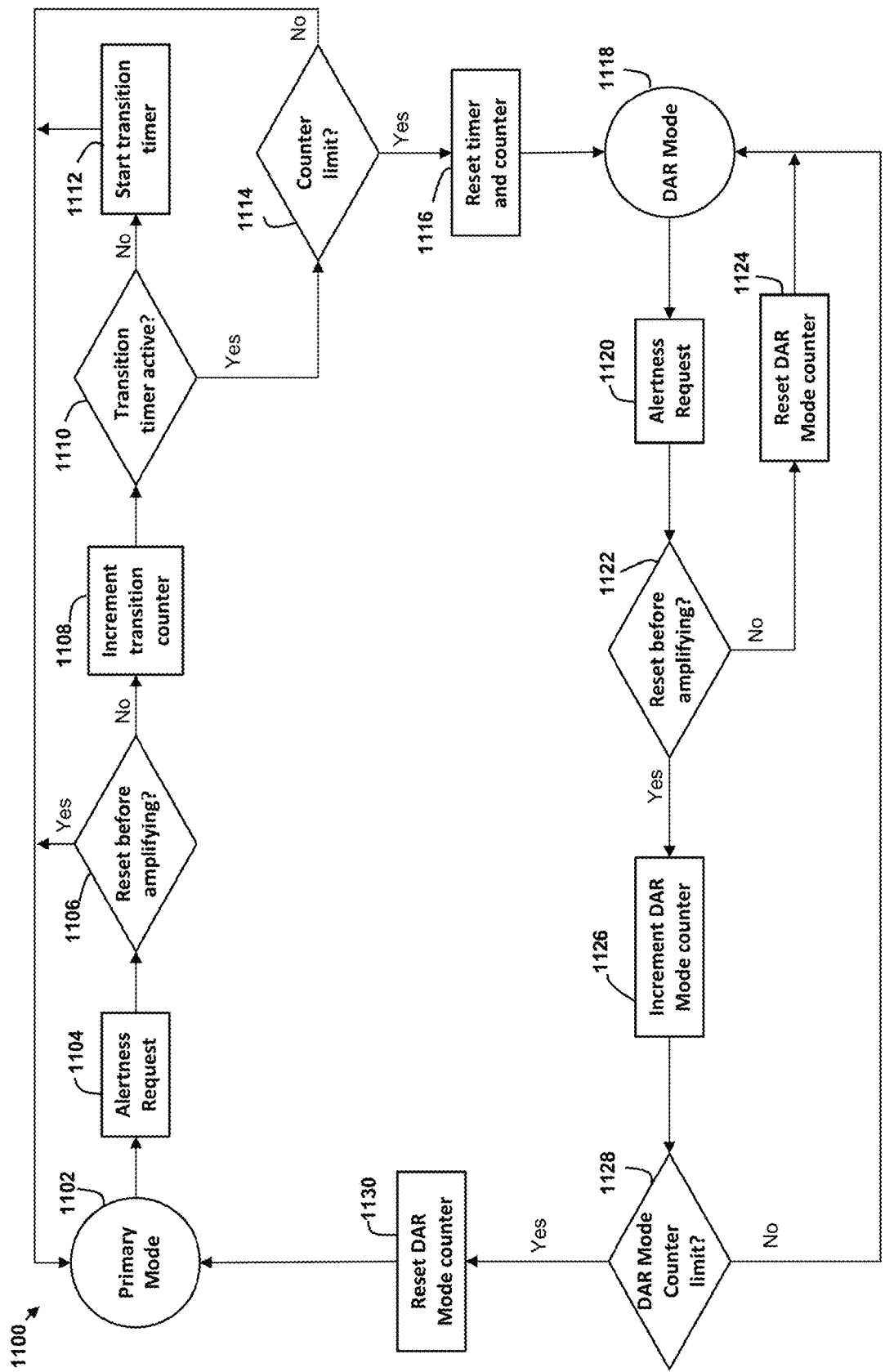
FIG. 11 is a flow chart illustrating a method in accordance with an embodiment.

Different modes of an alertness monitoring system are described in greater detail with respect to FIGS. 9-11.

As the determined routine is operating a request may be received, at 616, to suspend the determined routine. Suspending the routine may include stopping the generation of alertness requests until the routine is reinstated, or suspending the routine may include reducing the frequency at which the alertness requests are generated until the routine is reinstated. The reduced frequency may be periodic or not periodic. Suspending the routine may allow the operator more time to perform a task. The task may be a personal task (e.g., bathroom break) or it may be a task that is typically performed while operating the vehicle system. For example, the vehicle system may be moving through a congested area and the operator would prefer to not be distracted by the alertness requests.

The request may be submitted by the onboard operator, such as when the operator determines that he or she would like a personal break. The request may also be submitted by an off-board party, such as a person remotely controlling the vehicle system or a system that has determined the onboard operator should receive a break. The suspension request may also be self-submitted by the onboard controller or control system. For example, the onboard controller could determine that the operator has not had a personal break for an extended period of time. The onboard controller can determine that the operator should take a personal break or should have fewer distractions based on response time to the alertness requests and/or physiological data. In these cases, the onboard controller automatically generates the suspension request.

The suspension requests may include a request for an immediate suspension of the routine or a request that the routine be suspended at a time. The request for suspending the routine may include a designated time period or periods for which the operator would like the routine suspended. The request for suspending the routine may include a designated route segment for which the operator would like the routine suspended. The request may also include a starting point for the suspension without an end point. In such instances, embodiments may suggest a duration for the suspension or an end point to the route segment.

Responsive to receiving the request to suspend the routine, embodiments may determine, at 618, whether route segments (e.g., the current route segment or an upcoming route segment) are permissible route segments for suspending the routine. A permissible route segment may include a route characteristic of at least one of: (1) a reduced likelihood of operator-required events occurring, (2) a predicted workload for the operator that is less than a defined workload baseline, or (3) a predicted workload for the operator that is greater than a defined workload threshold. Operator-required events include those events that require the operator to manually control the vehicle system or those events in which the operator may immediately, if necessary, take over and manually control the vehicle system. Operator-required events are events in which it would be preferable to have the operator within the designated space (e.g., cabin) and ready to assume manual control. By way of example, operator-required events include checks on the wayside signals, controlling the vehicle system while arriving at destinations or a meet-up events, or events in which a person, animal, or object may move onto the track. If there is a high likelihood of such events occurring along a route segment, then the route segment may not be suitable for suspending the determine routine.

The permissible route segment or segments may be identified based on one or more of a parameter of the route segment, a trend of operating parameters of the vehicle, or an absence of traffic. The parameter of the route segment may include, for example, curvature, visibility, weather along the route segment, and the like.

As described herein, the decision on whether a route segment is permissible for suspending the determined routine may be based, at least in part, on a predicted workload for the route segment. The predicted workload may be determined, prospectively, using a workload model that receives certain inputs (e.g., type and makeup of vehicle system, number of crew members, which steps or tasks must be completed). Alternatively or in addition to using the workload model, the predicted workload may be based on data collection regarding past trips. The permissible route segment may be one that correlates to a workload capacity below a workload baseline. Alternatively, the permissible route segment may be one that correlates to a workload capacity above a workload threshold.

In some embodiments, the decision on whether a route segment is permissible for suspending the determined routine may be based, at least in part, on whether the vehicle system is automatically controlled while traveling along the route segment. The energy management system may include, for example, the Trip Optimizer™ system. Such embodiments may identify portions of the trip that may be controlled automatically by the vehicle control system.

Optionally, a permissible route segment may be selected at 619. For example, the controller may determine that multiple permissible route segments exist. In some embodiments, the controller may determine a permissibility metric (or P metric). The P metric indicates whether a route segment is more permissible for suspending the determined routine compared to other route segments. For example, although multiple route segments may have a workload capacity that is below a workload baseline, one or more route segments may be further below the workload baseline and, thus, more permissible. In some embodiments, the P metric may be presented to the operator when selecting the route segment for suspending the determined routine. Alternatively, the system may select the route segment for suspending the determined routine based on the different P metrics.

At 620, embodiments may answer the request by confirming that the routine may be suspended for the requested time period or route segment. Alternatively, embodiments may answer the request by denying the particular time period or route segment. Optionally, embodiments may propose a new time period and/or route segment. For example, embodiments may display on a control screen that the request has been denied (or accepted). In either case, embodiments may propose other upcoming route segments that may be permissible for having the routine suspended. The proposed route segments may be, for example, shown on the control screen. The operator may choose to select one of the proposed route segments.

Optionally, the suspension of the routine for a route segment may be announced at 621. The announcement may be local (e.g., to the operator) or the announcement may be transmitted to another party (e.g., person or technological system). For example, a local announcement may include notifying the operator that the routine is suspended or that the routine will be suspended upon arriving at a certain location (e.g., mile marker). Such notification may be displayed on the control screen or otherwise indicated in a perceptible manner (e.g., change in lighting or an audible sound).

As to a more outward announcement, the other party may be an entity that is in communication with the vehicle system. As such, the announcement may be generated as a signal at the vehicle system and the signal may be transmitted to the other party. As an example, the announcement may be directed to a remote controller (e.g., a system or individual that monitors and remotely controls one or more aspects of the vehicle system). The announcement can be directed to a data center (e.g., back office) that monitors a fleet of vehicle systems. The announcement may include informing the other party (e.g., system or individual that is remotely controlling the vehicle system or the data center) as to why the suspension was requested (e.g., personal break or for traveling through a congested area).

Alternative to or in addition to the above, announcing the suspension of the determined routine can include informing other vehicle systems that the vehicle system has the determined routine suspended or will be suspended. For example, the announcement may be directed to other vehicle systems that will be operating near the vehicle system that will have its determined routine suspended.

At 622, the routine is suspended as described above. At some point, the suspension may cease, at 624, and the routine may be reinstated. Reinstatement of the routine may be responsive to one or more conditions being satisfied. For example, reinstatement of the routine may be responsive to at least one of determining that a designated time period has elapsed, determining that a designated event has occurred, receiving a designated input from the operator, determining that the permissible route segment has been completed or is near completion, receiving a signal from an off-board system, determining that another vehicle is approaching, determining that proximate weather conditions have changed, determining that traffic proximate to the permissible route segment has changed, or determining that the vehicle is traveling along the permissible route segment during a local time period associated with traffic.

Reinstatement of the determined routine may include reinstating a routine that is identical to the routine prior to suspension or reinstating a routine that is different from the routine prior to suspension. For example, the alertness requests may be less frequent (e.g., because the operator has recently had a personal break) or the alertness requests may be more frequent (e.g., because the operator is returning after eating a meal). Upon reinstating the routine, the method of FIG. 6 may be repeated throughout the trip.

Figure 7:
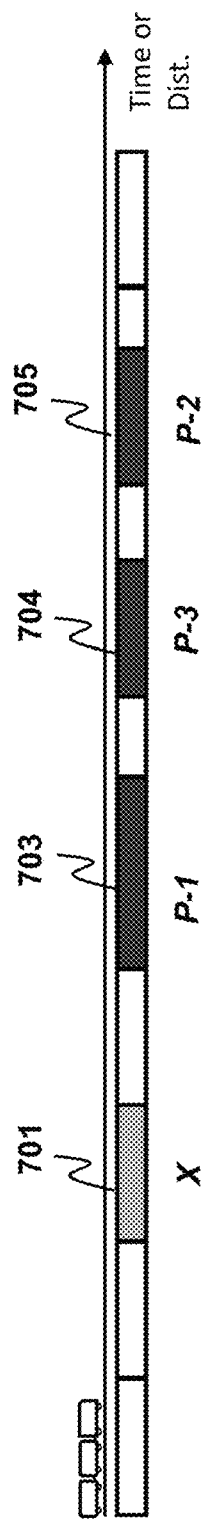
FIG. 7 is a schematic illustration of a trip having at least one permissible route segment that can be suspended in accordance with an embodiment.
Figure 8:
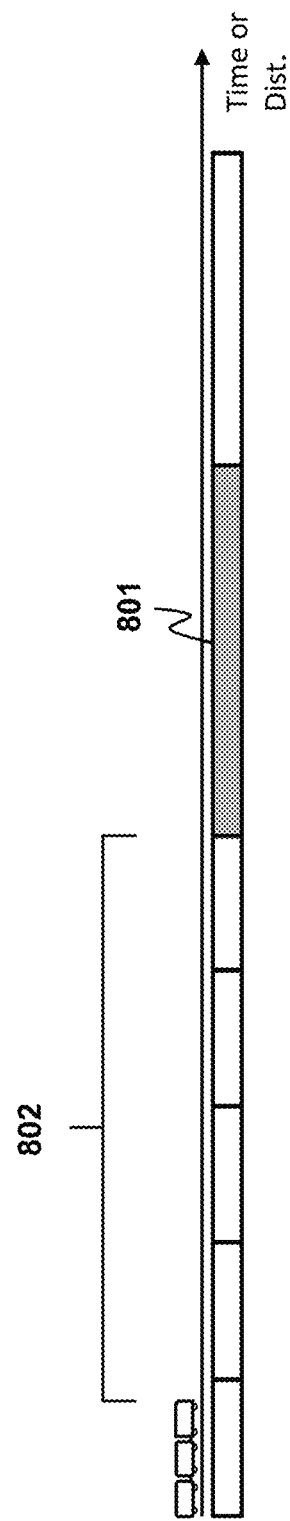
FIG. 8 is a schematic illustration of a trip having at least one permissible route segment that can be suspended in accordance with an embodiment.

FIGS. 7 and 8 show different illustrations that may be presented to an operator regarding suspending the determine routine. For example, FIGS. 7 and 8 may be presented on the control screen. FIG. 7 illustrates a route segment 701 that was requested by the operator for suspending the determined routine. In situation of FIG. 7, the controller has denied this request but proposed three other options to the operator, which are identified as route segments 703, 704, 705. Moreover, the controller has indicated which route segments are more permissible (e.g., are less likely to be reinstated early). As show, the route segment 701 is identified as "P-1," which means more permissible in this example.

FIG. 8 illustrates a route segment 801 for which the determined routine will be suspended. The illustration shown in FIG. 8 may occur when the onboard controller or a third party determines that the operator will benefit from the routine being suspended. As such, the control screen may announce that a personal break may be taken for the route segment shown. Optionally, the control screen may indicate a time, at 802, at which the personal break may be taken.

FIGS. 9 and 10 illustrates layouts 900, 1000, respectively, that may be displayed to an operator on a control screen by an alertness monitoring system. Each of the layouts provides an example of a directed alertness request (DAR). In some embodiments, an alertness monitoring system is configured to operate according to different modes. For example, the alertness monitoring system may operate in a first mode and also in a second mode that is different than the first mode. The second mode may change the actions and/or cognitive processes that the operator has become accustomed to with the first mode. The second mode may use a different set of alertness requests that enhance vigilance or attentiveness. For example, the second mode may use alertness requests intended to use a higher degree of associated cognitive processing by the operator than the alertness requests of the first mode.

The first mode may be similar or identical to the determined alerter routines described herein or to those used by known alerter systems. The second mode, however, may be activated to change how the operator has been accustomed to interacting with the alertness monitoring system. For example, the second mode may be activated: (1) after a designated period of time during the trip (e.g., every other thirty minutes of a trip), (2) after a designated period of time since an automatic operating mode has been activated (e.g., ten minutes after the automatic operating mode began), (3) after a designated period of time in which the standard mode (or the first mode) has been active (e.g., after thirty minutes of the standard mode being used), or (4) responsive to determining that the vigilance of the operator appears less than desired.

As used herein, the phrase "responsive to determining that the vigilance of the operator appears less than desired," and similar phrases, does not require calculating a vigilance value/metric or following a strict protocol. Instead, an operator's vigilance may appear less than desired after determining that one or more events have occurred, after determining that one or more characteristics of the operator have been detected (e.g., head nodding, eyes being partially closed, and the like), or a combination thereof. For example, if the operator fails to respond to an alertness request prior to the alertness request being amplified or enhanced (e.g., an audio alarm activated), then it may be determined that the operator's vigilance appears less than desired. Moreover, this determination may be made by a remotely controlling individual or system (e.g., dispatch center) that subsequently instructs the alertness monitoring system to activate the second mode.

In FIG. 9, an alertness request 901 is shown in the display area 910 and includes an operator-engageable element 904 and a message 912 that prompts the operator to engage the operator-engageable element. The operator-engageable element appears where a user-activatable element appeared previously on the display area prior to the alertness request appearing. For example, the layout of the display area includes information that characterizes current and/or future operation of the vehicle system (e.g., speed, fuel level, notch setting, brake setting, status of different vehicles of the vehicle system, etc.). The layout also includes an array 902 of user-activatable elements 906. The user-activatable elements may be keys or, more specifically, soft keys that are programmable to have a select function rather than being associated with a single fixed function or a fixed set of functions. As shown, the user-activatable elements are GUI elements displayed on the control screen. As such, the operator-engageable element is a designated area of the display area of the control screen. In other embodiments, the user-activatable elements may be physical elements (e.g., buttons or physical keys) that are accessible to the operator. In such instances, the operator may be informed of which operator-engageable element to engage by, for example, making the physical element flash, audible instructions, or by information presented on the control screen.

Although FIG. 9 shows the array of user-activatable elements as phantom boxes, the user-activatable elements may visually disappear when the alertness request is shown such that only the operator-engageable element ("Alerter Reset") is shown where the array was located. Alternatively, the other user-activatable elements may remain displayed while the operator-engageable element appears and replaces only the one user-activatable element or a limited number of the user-activatable elements.

In some embodiments, the subsequent alertness request may include an operator-engageable element at a different position than the position of the prior operator-engageable element. For example, a series of alertness requests in the DAR mode may have the operator-engageable element positioned as follows: (1) F5 [or as shown in FIG. 9], (2) D7, (3) F1, and (4) D2. The positions of the operator-engageable elements may be randomly selected so that operator cannot predict where the next operator-engageable element will be located.

Optionally, the alertness request may also include the message. In FIG. 9, the message is: "Press Key to Reset Alerter." Thus, each alertness request may include a randomly positioned designated area to be engaged by the operator and an optional message to engage the designated area. Also shown, when the alertness request is presented to the operator, a notification 914 may also appear that informs the operator that an alertness request has been activated and should be answered by the operator.

In FIG. 10, an alertness request 1001 is shown in the display area 1010 and includes an operator-engageable element 1006, a message 1004, and a notification 1014. The message and the notification prompt the operator to engage the operator-engageable element. In the illustrated embodiment, the operator-engageable element is a pad that presents characters to the operator for engaging on the display area. In other embodiments, the pad may be a physical pad (e.g., key pad) that is separate from the control screen. In the illustrated embodiment, the pad includes only numbers but it may include a combination of letters, numbers, and/or other symbols. The alertness request prompts the user to enter a sequence of characters. The sequence is shown in the message. Entering the sequence resets the alertness monitoring system.

As shown, the characters are grouped together in the pad. In other embodiments, the display area may include multiple characters spaced apart from one another in designated areas or scattered in random areas. The message may instruct the operator to locate and engage one or more of the characters by pressing the control screen where the character is positioned.

For some cabins or other control rooms, the operator interface includes more than one control screen. The multiple control screens may show the same or different information to the operator. In some embodiments, the alertness request is presented on more than one screen. In particular embodiments, the alertness request is shown on each of the screens. In other embodiments, the alertness request is presented only at the control screen where the operator should be present so that other individuals could not respond to the alertness request.

Accordingly, the DAR mode may request inputs from the operator that require more complex cognitive processes than the inputs required in the standard mode. To discourage routine reactions by the operator and/or promote use of the control screen, the alertness monitoring system may not be reset if the operator engages the physical alerter push-button instead of the designated operator-engageable element. In some embodiments, one or more other inputs for resetting the alertness monitoring system may exist. Such embodiments may comply with local, regional, or federal regulations that require multiple options for resetting the alertness monitoring system. For example, in addition to the operator-engageable element displayed on the control screen, other acceptable inputs may include changing the throttle setting (e.g., moving the throttle handle), changing the brake setting (e.g., moving the dynamic brake control handle), or activating the bell switch. However, in particular embodiments, engagement of the designated operator-engageable element is required to exit DAR mode.

Responsive to engaging the alertness request, the alertness monitoring system may reset. More specifically, the alertness request will disappear and the display prior to the alertness request may reappear. The alertness monitoring system may end the DAR mode and re-activate the standard mode (or first mode). Alternatively, the alertness monitoring system may remain in the DAR mode such that the next alertness request is located at a different position or contains a different sequence of characters.

FIG. 11 shows a flow chart illustrating a method 1100 in accordance with one embodiment. The method may be, for example, a method of operating an alertness monitoring system or a method of operating a vehicle system with a human operator. The method may be carried out by the vehicle system described herein. The method may also be implemented by one or more processors that are configured to execute one or more sets of instructions stored in memory (e.g., one or more computer-readable mediums). The computer-readable medium (e.g., a tangible and non-transitory computer readable storage medium) may have one or more programs (or sets of instructions) that direct the controller to perform one or more operations, such as those described herein. For example, the methods may be implemented by one or more processors within, for example, a vehicle having an operator that is physically present and onboard with at least a portion of the alertness monitoring system. In such an embodiment, the steps or operations described herein may be performed by a program stored in memory and operable in a processor (e.g., microprocessor or other logic-based device). When implemented in a processor, program code may configure the processor to create logical and arithmetic operations to process the steps and/or operations.

The method includes a primary mode (or first mode) 1102 and a DAR mode (or second mode) 1118. In some embodiments, the DAR mode is activated in response to determining that the vigilance of the operator appears less than desired. The method in FIG. 11 activates the DAR mode after the operator has performed a designated number of alertness request resets (e.g., two) only after the alertness request was enhanced or amplified (e.g., made more noticeable to the operator). However, this is just one example of how the operator's vigilance may be determined to appear less than desired. Other methods may be used.

At 1102, the primary mode is activated. The primary mode may be activated at the beginning of the trip or activated after the DAR mode (or another mode) has ended. At 1104, an alertness request is generated and reactive inputs are received to reset the alertness request. At 1106, it is queried whether the alertness request was reset prior to the alertness request being amplified or enhanced. For example, the initial alertness request may be a flashing sign or area of the control screen that requests the operator to press a push-button. If the operator engages the push-button within a designated time period (e.g., five seconds), then the method returns to the primary mode at 1102.

If the operator does not engage the push-button within a designated time period (e.g., five seconds), then the alertness request may be amplified by, for example, at least one of generating an audible alarm, shaking a tool (e.g., handle), causing lights to flash or brighten. If the operator fails to respond to the amplified alertness request, then a penalty brake application or other consequence is implemented. If the operator responds by resetting the amplified alertness request, then a transition counter 1108 is incremented (+1).

At 1110, it may be queried whether a transition timer is active. If the transition timer is not active, the transition timer is activated. If the transition timer was previously activated, then it may be queried whether the transition counter has obtained a limit while the transition timer was active. In other words, the transition counter and the transition timer determine whether the operator failed to appropriately respond to multiple alertness requests within a designated time period. For example, if the counter has reached a designated number (e.g., 2 or 3), and the transition timer is still active, then the method determines that the DAR mode should be activated at 1116. Prior to activation of the DAR mode, the transition timer and the counter are reset at 1114. If the counter has not reached a limit while the timer is active, the method returns to the primary mode at 1102.

With the DAR mode activated, an alertness request is generated at 1120. Similar to the primary mode, it may be queried, at 1122, whether the alertness request in the DAR mode was reset prior to the alertness request in the DAR mode being amplified or enhanced. For example, the initial alertness request in the DAR mode may be similar or identical to the alertness requests described with respect to FIGS. 9 and 10. If the operator engaged the alertness request as instructed prior to the alertness request being amplified, then a DAR mode counter is incremented at 1126. If the operator did not engage the alertness request as instructed, then the DAR mode counter is reset at 1124.

At 1128, it may be queried whether the DAR mode counter has reached a designated limit. If the DAR mode counter has reached the designated limit (e.g., 2 or 3), then the DAR mode counter is reset at 1130 and the method returns to the primary mode at 1102. If the DAR mode counter limit has not been reached, then the method returns to the DAR mode at 1118.

Accordingly, the alertness monitoring system transitions from a primary mode to a DAR mode if one or more conditions are satisfied that indicate the operator appears less vigilant then desired. The alertness monitoring system then transitions from the DAR mode to the primary mode if it is determined that the operator has appropriately responded to alertness requests in the DAR mode. More specifically, the alertness requests in the DAR mode may require more complex cognitive processes to respond. By properly responding to the more complex alertness requests, the operator may prove to the alertness monitoring system that the operator is more vigilant or alert.

In an embodiment, a system is provided that includes a controller comprising one or more processors configured to generate alertness requests to an operator of a vehicle system during a trip. The alertness requests are generated according to a determined routine. The controller is further configured to receive reactive inputs from the operator that are responsive to the alertness requests. The controller is further configured to determine whether the trip includes a permissible route segment for suspending the determined routine. The permissible route segment has a route characteristic of one or both of: a reduced likelihood of operator-required events occurring or a predicted workload for the operator that is less than a defined workload threshold.

Optionally, the controller is further configured to one or both of: suspend the determined routine for the permissible route segment or announce a suspension of the determined routine for the permissible route segment.

Optionally, the controller is further configured to detect an attentive quality of the operator that indicates alertness of the operator while operating the vehicle system. Responsive to detecting the attentive quality, the determined routine delays generating a subsequent alertness request. The attentive quality includes at least one of a direct action taken by the operator for controlling the vehicle system or a physiological feature of the operator indicating alertness.

Optionally, determining that the trip includes the permissible route segment includes determining that the trip includes a plurality of permissible route segments. The controller is configured to select one of the plurality of permissible route segments or receive an input for selecting one of the plurality of permissible route segments.

Optionally, the controller is further configured to reinstate the determined routine in response to at least one of determining that a designated time period has elapsed, determining that a designated event has occurred, receiving a designated input from the operator, determining that the permissible route segment has been completed or is near completion, receiving a signal from an off-board system, determining that another vehicle is approaching, determining that proximate weather conditions have changed, determining that traffic proximate to the permissible route segment has changed, or determining that the vehicle system is traveling along the permissible route segment during a local time period associated with traffic.

Optionally, the controller is further configured to receive a suspension request and, responsive to receiving the suspension request, the controller is configured to one or both of: suspend the determined routine for the permissible route segment or announce the suspension of the determined routine for the permissible route segment.

Optionally, the controller is configured to determine whether the trip includes the permissible route segment for suspending the determined routine based on task-specific data for a single member crew.

Optionally, the controller is further configured to modify at least one of tractive efforts or braking efforts of the vehicle system to adjust a time at which the vehicle system will arrive at the permissible route segment.

Optionally, the permissible route segment is permitted for switching from a manual operating mode to an automatic operating mode.

Optionally, the permissible route segment is identified based on one or more of a parameter of the route segment, a trend of operating parameters of the vehicle system, or an absence of traffic. A parameter of the route segment may include one or more of a speed limit, a grade, a curvature, wayside information, a cant, terrain characteristics, historical alertness data, or transitions in speed limits along the route segment. Trending operating parameters can include, but are not limited to, operational settings (e.g., speed, acceleration, throttle positions, brake settings (e.g., brake pressures), or the like), operator alertness, fuel efficiency, weather conditions, terrain, or availability of independent distributed power.

In an embodiment, a system is provided that includes a controller comprising one or more processors configured to generate alertness requests to an operator of a vehicle system during a trip. The alertness requests are generated according to a determined routine. The controller is further configured to receive reactive inputs from the operator that are responsive to the alertness requests. The controller is further configured to determine whether the trip includes a permissible route segment for suspending the determined routine. The permissible route segment has a route characteristic of at least one of: a reduced likelihood of operator-required events occurring, a predicted workload for the operator that is less than a defined workload baseline, or a predicted workload for the operator that is greater than a defined workload threshold.

In an embodiment, a method is provided that includes generating alertness requests to an operator of a vehicle system during a trip according to a determined routine. The method also includes receiving reactive inputs from the operator that are responsive to the alertness requests. The method also includes determining whether the trip includes a permissible route segment for suspending the determined routine. The permissible route segment has a route characteristic of at least one of: a reduced likelihood of operator-required events occurring, a predicted workload for the operator that is less than a defined workload baseline, or a predicted workload for the operator that is greater than a defined workload threshold.

Optionally, the method further comprises one of: suspending the determined routine for the permissible route segment or announcing a suspension of the determined routine for the permissible route segment.

Optionally, the method further comprises detecting an attentive quality of the operator that indicates alertness of the operator while operating the vehicle system. Responsive to detecting the attentive quality, the determined routine delays generating a subsequent alertness request.

Optionally, the method further comprises receiving a suspension request from the operator and, responsive to receiving the suspension request, one or both of: suspending the determined routine for the permissible route segment or announcing the suspension of the determined routine for the permissible route segment.

Optionally, determining whether the trip includes the permissible route segment for suspending the determined routine is based on task-specific data for a single member crew.

Optionally, the method further comprises modifying at least one of tractive efforts or braking efforts of the vehicle system to adjust a time at which the vehicle system will arrive at the permissible route segment.

In an embodiment, a vehicle control system is provided that includes an alertness monitoring system configured to generate alertness requests to an operator of a vehicle system and receive reactive inputs from the operator that are responsive to the alertness requests. The alertness monitoring system is further configured to detect an attentive quality of the operator that indicates alertness of the operator while operating the vehicle system. The vehicle control system also includes a controller configured to communicate the alertness requests to the alertness monitoring system according to a determined routine. Responsive to receiving the reactive inputs or detecting the attentive quality, the determined routine delays generating a subsequent alertness request. The controller is further configured to receive a suspension request and, responsive to receiving the suspension request, the controller is further configured to determine whether the trip includes a permissible route segment for suspending the determined routine.

Optionally, the controller is configured to determine whether the trip includes the permissible route segment for suspending the determined routine based on task-specific data for a single member crew.

Optionally, the controller is further configured to one or both of: suspend the determined routine for the permissible route segment or announce a suspension of the determined routine for the permissible route segment.

Optionally, the suspension request is submitted by the operator or by a remote station.

Optionally, the alertness monitoring system is further configured to switch between a first mode with a first set of alertness requests and a second mode with a second set of alertness requests that differ from the first set of alertness requests, wherein the second set of alertness requests require a higher degree of associated cognitive processing by the operator than the first set of alertness requests.

In an embodiment, a system is provided that includes a controller comprising one or more processors configured to generate alertness requests to an operator of a vehicle system during a trip. The alertness requests are generated according to a determined routine. The controller is further configured to receive reactive inputs from the operator that are responsive to the alertness requests. The controller is further configured to switch between a first mode having first alertness requests and a second mode having second alertness requests that differ from the first alertness requests. The reactive inputs for responding to the second alertness requests require a higher degree of associated cognitive processing by the operator than the reactive inputs for responding to the first alertness requests.

Optionally, the controller is further configured to switch from the first mode to the second mode in response to determining that the operator appears less vigilant.

Optionally, the controller is further configured to switch from the second mode to the first mode in response to determining that the operator has answered the second alertness requests with a sufficient degree of vigilance.

As described herein, embodiments may be implemented by one or more processors that are configured to execute one or more sets of instructions stored in memory (e.g., one or more computer-readable mediums). The set of instructions may include various commands that instruct the computer or processor as a processing machine to perform specific operations such as the methods and processes described herein. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine. The program may be compiled to run on, for example, a 32-bit, or 64-bit operating systems.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed:

1. A system comprising:
a controller comprising one or more processors configured to generate alertness requests to an operator of a vehicle system during a trip, the alertness requests being generated according to a determined routine, the controller further configured to receive reactive inputs from the operator that are responsive to the alertness requests; and
the controller is further configured to receive a suspension request and, responsive to receiving the suspension request, determine whether the trip includes a permissible route segment for suspending the determined routine, the permissible route segment having a route characteristic of at least one of: a reduced likelihood of operator-required events occurring, a predicted workload for the operator that is less than a defined workload baseline, or a predicted workload for the operator that is greater than a defined workload threshold.

2. The system of claim 1, wherein the controller is further configured to one or both of: suspend the determined routine for the permissible route segment or announce a suspension of the determined routine for the permissible route segment.

3. The system of claim 1, wherein the controller is further configured to detect an attentive quality of the operator that indicates alertness of the operator while operating the vehicle system, wherein, responsive to detecting the attentive quality, the determined routine delays generating a subsequent alertness request, wherein the attentive quality includes at least one of a direct action taken by the operator for controlling the vehicle system or a physiological feature of the operator indicating alertness.

4. The system of claim 1, wherein determining that the trip includes the permissible route segment includes determining that the trip includes a plurality of permissible route segments, wherein the controller is configured to select one of the plurality of permissible route segments or receive an input for selecting one of the plurality of permissible route segments.

5. The system of claim 1, wherein the controller is further configured to reinstate the determined routine in response to at least one of determining that a designated time period has elapsed, determining that a designated event has occurred, receiving a designated input from the operator, determining that the permissible route segment has been completed or is near completion, receiving a signal from an off-board system, determining that another vehicle is approaching, determining that proximate weather conditions have changed, determining that traffic proximate to the permissible route segment has changed, or determining that the vehicle system is traveling along the permissible route segment during a local time period associated with traffic.

6. The system of claim 1, wherein the controller is further configured to one or both of: suspend the determined routine for the permissible route segment or announce the suspension of the determined routine for the permissible route segment.

7. The system of claim 1, wherein the controller is configured to determine whether the trip includes the permissible route segment for suspending the determined routine based on task-specific data for a single member crew.

8. The system of claim 1, wherein the controller is further configured to modify at least one of tractive efforts or braking efforts of the vehicle system to adjust a time at which the vehicle system will arrive at the permissible route segment.

9. A method comprising:
generating alertness requests to an operator of a vehicle system during a trip according to a determined routine;
receiving reactive inputs from the operator that are responsive to the alertness requests; and
responsive to receiving a suspension request, determining whether the trip includes a permissible route segment for suspending the determined routine, the permissible route segment having a route characteristic of at least one of: a reduced likelihood of operator-required events occurring, a predicted workload for the operator that is less than a defined workload baseline, or a predicted workload for the operator that is greater than a defined workload threshold.

10. The method of claim 9, wherein the method further comprises one of:
suspending the determined routine for the permissible route segment; or
announcing a suspension of the determined routine for the permissible route segment.

11. The method of claim 9, wherein the method further comprises detecting an attentive quality of the operator that indicates alertness of the operator while operating the vehicle system, wherein, responsive to detecting the attentive quality, the determined routine delays generating a subsequent alertness request.

12. The method of claim 9, wherein the method further comprises one or both of: suspending the determined routine for the permissible route segment or announcing the suspension of the determined routine for the permissible route segment.

13. The method of claim 9, wherein determining whether the trip includes the permissible route segment for suspending the determined routine based on task-specific data for a single member crew.

14. The method of claim 9, wherein the method further comprises modifying at least one of tractive efforts or braking efforts of the vehicle system to adjust a time at which the vehicle system will arrive at the permissible route segment.

15. A vehicle control system comprising:
an alertness monitoring system configured to generate alertness requests to an operator of a vehicle system and receive reactive inputs from the operator that are responsive to the alertness requests, the alertness monitoring system further configured to detect an attentive quality of the operator that indicates alertness of the operator while operating the vehicle system,
a controller configured to communicate the alertness requests to the alertness monitoring system according to a determined routine, wherein, responsive to receiving the reactive inputs or detecting the attentive quality, the determined routine delays generating a subsequent alertness request;
the controller further configured to receive a suspension request for suspending the determined routine and, responsive to receiving the suspension request, the controller is further configured to determine whether a trip includes a permissible route segment for suspending the determined routine.

16. The system of claim 15, wherein the controller is configured to determine whether the trip includes the permissible route segment for suspending the determined routine based on task-specific data for a single member crew.

17. The system of claim 15, wherein the controller is further configured to one or both of: suspend the determined routine for the permissible route segment or announce a suspension of the determined routine for the permissible route segment.

18. The system of claim 15, wherein the suspension request is submitted by the operator, an onboard controller, or by a remote station.

19. The system of claim 15, wherein the alertness monitoring system is further configured to switch between a first mode with a first set of alertness requests and a second mode with a second set of alertness requests that differ from the first set of alertness requests, wherein the second set of alertness requests require a higher degree of associated cognitive processing by the operator than the first set of alertness requests.

20. The system of claim 1, wherein the controller is further configured to receive the suspension request from at least one of the operator, an onboard controller, or a remote station.

21. The system of claim 1, wherein the controller is further configured to suspend the determined routine for the permissible route segment and, after suspending the determined routine, the controller is further configured to reinstate the determined routine, wherein the alertness requests would have been generated by the controller according to the determined routine along the permissible route segment if not for the suspension of the determined routine.

* * * * *